United States Patent
Rehder et al.

(10) Patent No.: US 6,465,926 B2
(45) Date of Patent: Oct. 15, 2002

(54) CLEANING/COOLING OF HIGH-POWER ROTARY CURRENT COLLECTOR SYSTEM

(75) Inventors: Robert Henry Rehder, Peterborough (CA); Melvin George Johnson, Peterborough (CA); Richard Kenneth Barton, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/731,875

(22) Filed: Dec. 8, 2000

(65) Prior Publication Data

US 2002/0070623 A1 Jun. 13, 2002

Related U.S. Application Data

(60) Provisional application No. 60/215,670, filed on Jun. 30, 2000.

(51) Int. Cl.[7] .......................... H02K 13/00; H02K 9/28; H01R 39/08
(52) U.S. Cl. .......................... 310/227; 310/52; 310/219; 310/228; 310/232
(58) Field of Search .......................... 310/232, 52, 54, 310/59, 62, 227, 228, 229, 219

(56) References Cited

U.S. PATENT DOCUMENTS

| | | | | |
|---|---|---|---|---|
| 809,220 A | * | 1/1906 | Reist | 310/232 |
| 1,066,175 A | * | 7/1913 | Barry | 310/54 |
| 1,719,407 A | * | 7/1929 | Trudeau | 310/227 |
| 2,606,946 A | * | 8/1952 | Fisher | 310/227 |
| 2,979,685 A | * | 4/1961 | Filipczak | 310/232 |
| 3,471,708 A | | 10/1969 | Rauhut | 307/85 |
| 3,654,378 A | | 4/1972 | Rehder | 174/16.2 |
| 3,673,447 A | * | 6/1972 | Zumbach et al. | 310/227 |
| 3,694,728 A | | 9/1972 | Kanngiesser et al. | 363/51 |
| 3,701,938 A | | 10/1972 | Chadwick | 363/51 |

(List continued on next page.)

FOREIGN PATENT DOCUMENTS

| | | |
|---|---|---|
| CA | 2 170 686 A | 10/1996 |
| DE | 1926878 | 7/1968 |
| DE | 1 488 773 | 4/1969 |
| DE | 2062853 | 12/1970 |
| DE | 34 43 428 A1 | 6/1985 |
| EP | 0 739 087 A | 10/1996 |
| GB | 1 157 885 | 7/1969 |
| GB | 2 055 515 A | 3/1981 |

OTHER PUBLICATIONS

Goto et al, "Power System Stabilizing Control by Adjustable Speed Pumped Storage Power Station Using Stabilizing Signals", CIGRE Symposium Tokyo 1995, pp. 1–6.

Puchstein, Lloyd, Conrad, "Alternating–Current Machines", 3rd Edition, John Wiley & Sons, Inc., NY, 1954, pp. 425–428, particularly Fig. 275 on p. 428.

(List continued on next page.)

Primary Examiner—Burton S. Mullins
(74) Attorney, Agent, or Firm—Nixon & Vanderhye, P.C.

(57) ABSTRACT

An electrical current collector system (20) comprises an electrically conductive slip ring (27) mounted to a rotatable shaft (28), as well as a fixed conducting ring assembly (44) having slip ring-contacting members (240, 404) mounted thereon. The slip ring (27) and fixed conducting ring assembly (44) are mounted to have an annular gap (48) formed therebetween. A slip ring support assembly (42) comprising plural post insulators (102) spaced radially about the rotatable shaft attaches the conductive slip ring to the rotatable shaft. The slip ring and fixed conducting ring assembly are at least partially enclosed in a compartment (57), to which a source (302) applies a cooling/cleaning fluid. In accordance with the structure and method of the invention, the source directs the fluid over at least some of the post insulators for cleaning of the post insulators. Then the fluid travels through the gap to perform at least one of cooling and cleaning of an interface of the slip ring and the slip ring-contacting members. The conductive ring channel then directs the fluid in at least a partially semicircular path to an exhaust duct (350).

57 Claims, 13 Drawing Sheets

U.S. PATENT DOCUMENTS

| | | | |
|---|---|---|---|
| 3,823,248 A | | 7/1974 | Christie et al. ............ 174/16.2 |
| 3,836,837 A | | 9/1974 | Rauhut ....................... 363/150 |
| 3,975,646 A | | 8/1976 | Kilgore et al. ................ 307/21 |
| 4,019,115 A | | 4/1977 | Lips ............................ 363/65 |
| 4,071,882 A | | 1/1978 | Rehder ....................... 361/602 |
| 4,072,997 A | | 2/1978 | Boothman et al. .......... 361/103 |
| 4,119,873 A | * | 10/1978 | Sakurai ....................... 310/56 |
| 4,179,729 A | | 12/1979 | Stanton et al. .............. 363/175 |
| 4,238,822 A | | 12/1980 | Schade ....................... 363/107 |
| 4,249,237 A | | 2/1981 | Ronk et al. .................. 363/150 |
| 4,251,736 A | | 2/1981 | Coleman ..................... 307/46 |
| 4,296,346 A | * | 10/1981 | Ooki et al. .................. 310/242 |
| 4,302,716 A | | 11/1981 | Glavitsch et al. ........... 323/217 |
| 4,336,488 A | | 6/1982 | Glavitsch et al. ........... 323/215 |
| 4,430,574 A | | 2/1984 | Ogiwara ...................... 290/52 |
| 4,441,029 A | | 4/1984 | Kao ............................ 290/52 |
| 4,445,049 A | | 4/1984 | Steigerwald ................. 307/45 |
| 4,476,410 A | * | 10/1984 | Wolcott ....................... 310/228 |
| 4,489,261 A | | 12/1984 | Hartwig et al. ............. 318/700 |
| 4,490,808 A | | 12/1984 | Jasmin ..................... 333/28 R |
| 4,503,377 A | | 3/1985 | Kitabayahi et al. ......... 318/807 |
| 4,517,471 A | | 5/1985 | Sachs .......................... 307/67 |
| 4,621,211 A | * | 11/1986 | Spirk .......................... 310/232 |
| 4,625,125 A | | 11/1986 | Kuwabara ................... 290/52 |
| 4,659,954 A | * | 4/1987 | Gunnoe ...................... 310/248 |
| 4,683,718 A | | 8/1987 | Larsson ....................... 60/327 |
| 4,694,189 A | | 9/1987 | Haraguchi et al. ........ 290/40 C |
| 4,713,566 A | * | 12/1987 | Moore et al. ................ 310/58 |
| 4,742,827 A | | 5/1988 | Shiozaki et al. ............ 318/798 |
| 4,754,156 A | | 6/1988 | Shiozaki et al. ............. 290/52 |
| 4,788,647 A | | 11/1988 | McManus et al. .......... 700/287 |
| 4,794,544 A | | 12/1988 | Albright et al. ............ 700/287 |
| 4,804,900 A | | 2/1989 | Soeda ........................ 318/719 |
| 4,806,781 A | | 2/1989 | Hochstetter .................. 290/43 |
| 4,816,696 A | | 3/1989 | Sakayori et al. .............. 290/52 |
| 4,823,018 A | | 4/1989 | Kuwabara et al. ............. 290/7 |
| 4,870,558 A | | 9/1989 | Luce ........................... 363/87 |
| 4,920,277 A | | 4/1990 | Kuwabara et al. ........ 290/40 C |
| 4,922,124 A | | 5/1990 | Seki et al. .................... 307/87 |
| 4,941,079 A | | 7/1990 | Ooi ............................ 363/132 |
| 4,992,721 A | | 2/1991 | Latos .......................... 322/10 |
| 4,994,684 A | | 2/1991 | Lauw et al. .................. 290/52 |
| 5,111,377 A | | 5/1992 | Higasa et al. ................ 363/95 |
| 5,166,597 A | | 11/1992 | Larsen et al. ............... 323/215 |
| 5,239,251 A | | 8/1993 | Lauw ......................... 318/767 |
| 5,341,280 A | | 8/1994 | Divan et al. .................. 363/37 |
| 5,343,139 A | | 8/1994 | Gyugyi et al. .............. 323/207 |
| 5,402,332 A | | 3/1995 | Kopf ........................... 700/29 |
| 5,469,044 A | | 11/1995 | Gyugyi et al. .............. 323/207 |
| 5,517,072 A | * | 5/1996 | Hildebrandt ................ 310/228 |
| 5,550,457 A | | 8/1996 | Kusase et al. ................ 322/29 |
| 5,608,615 A | | 3/1997 | Luce ......................... 363/102 |
| 5,742,515 A | | 4/1998 | Runkle et al. .............. 700/287 |
| 5,841,267 A | | 11/1998 | Larsen ....................... 323/215 |
| 5,853,294 A | | 12/1998 | Rehder ........................ 439/17 |
| 5,886,443 A | | 3/1999 | Dymond et al. ............ 310/196 |
| 5,923,113 A | * | 7/1999 | Lassila et al. .............. 310/232 |
| 5,923,114 A | * | 7/1999 | Senni ......................... 310/232 |
| 5,952,816 A | | 9/1999 | Larsen ....................... 323/215 |
| 5,953,225 A | | 9/1999 | Larsen ....................... 364/174 |
| 5,989,702 A | | 11/1999 | Draper et al. ............... 428/328 |
| 6,169,489 B1 | | 1/2001 | Kliman et al. .............. 340/648 |

OTHER PUBLICATIONS

Kron, "Equivalent Circuits of Electric Machinery", John Wiley & Sons, Inc., NY, Chapman & Hall, Ltd., London, 1951, pp. 150–163, particularly Fig. 9.5a on p. 156.

Larsen, et al, "Specification of AC Filters for HBDC Systems", IEEE Y&D Conference, New Orleans, 1989, pp. 1–8.

"Inductrol Voltage Regulators", General Electric Company, Publication 6070, Jun. 1974, pp. 30–31.

"Magnetic Circuits and Transformers", John Wiley & Sons, Inc., New York, pp. 497–515.

"Rotary Converter", Westinghouse Electric & Manufacturing Company, Circular No. 1028, Apr. 1903.

Enrique Lopez P., et al, "Control and Planning of 50/60 Hz Industrial System Load Flows", Aug. 1990, Proceedings of the Colloquium in S. America, Argentina, Brazil, Chile, Uruguay, pp. 162–167.

Strowger et al, "Speed Changes of Hydraulic Turbines for Sudden Changes of Load", No. 2009, The American Society of Mechanical Engineers, Presented at the Spring Meeting of the Society, San Francisco, CA, Jun. 28–Jul. 1, 1926, pp. 209–211 and 214–215.

Rauhut, "The Rotary Transformer", *Brown Boveri Review*, Sep. 1967, vol. 54, No. 9, pp. 554–564.

Rauhut et al., "Rotary Transformer Improves Interconnection", *Electrical World*, May 16, 1966, pp. 71–72.

U.S. patent application Ser. No. 08/828,502, filed Mar. 31, 1997, entitled "Interconnection System for Transmitting Power Between Electrical Systems".

U.S. patent application Ser. No. 09/443,220, filed Nov. 18, 1999, entitled "Power Flow Control With Rotary Transformers On Common Drive Shaft".

U.S. patent application Ser. No. 09/731,879, filed Dec. 8, 2000, entitled "Envelope for Slip–Ring Contacting Members in High–Power Rotary Current Collection System".

U.S. patent application Ser. No. 09/731,875, filed Dec. 8, 2000, entitled "Cleaning/Cooling of High–Power Rotary Current Collector System".

U.S. Provisional application Ser. No. 60/215,671, filed Jun. 30, 2000, entitled "Variable Frequency Transformer".

* cited by examiner

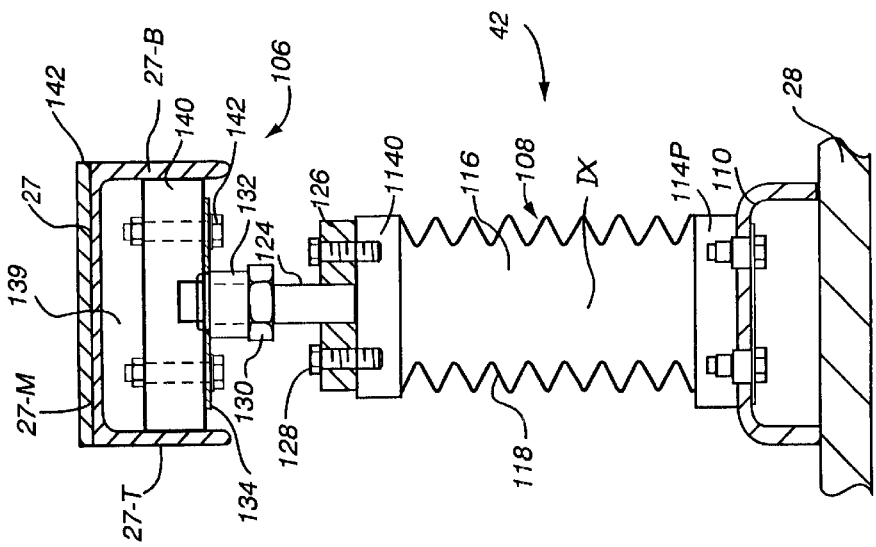
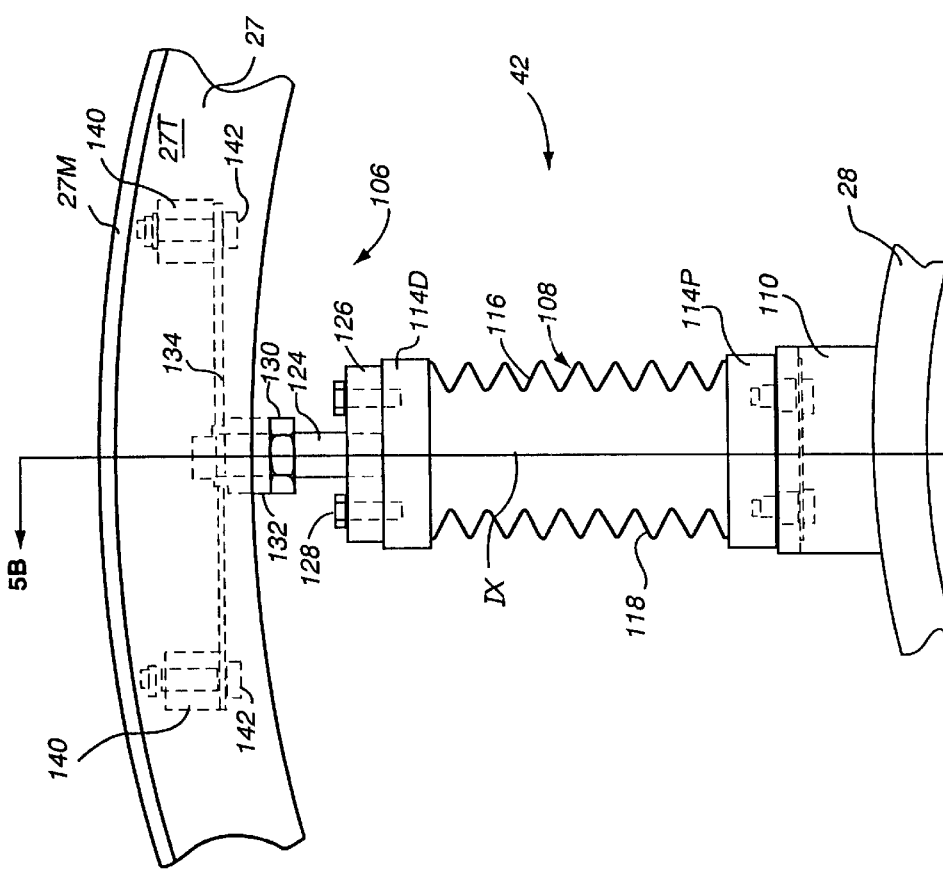
Fig. 5A
Fig. 5B

CLEANING/COOLING OF HIGH-POWER ROTARY CURRENT COLLECTOR SYSTEM

This application claims the priority and benefit of U.S. Provisional Patent Application Serial No. 60/215,670 filed Jun. 30, 2000, entitled "HIGHPOWER ROTARY CURRENT COLLECTOR SYSTEM", which is incorporated herein by reference in its entirety. Moreover, this application is related to simultaneously-filed U.S. patent application Ser. No. 09/731,875, entitled "SLIP-RING MOUNTING ASSEMBLY FOR HIGH-POWER ROTARY CURRENT COLLECTOR SYSTEM", and simultaneously-filed U.S. patent application Ser. No. 09/731,879, entitled "ENVELOPE FOR SLIP-RING CONTACTING MEMBERS IN HIGH-POWER ROTARY CURRENT COLLECTOR SYSTEM", both of which are incorporated herein by reference in their entirety.

BACKGROUND OF THE INVENTION

There are systems, such as synchronous motors and generators, which supply electrical current to a rotor winding by way of slip rings. The current is typically applied to the slip rings via brushes mounted on a fixed conducting ring. Ordinarily, the slip rings in such systems are at low voltage. Some high voltage systems also employ slip rings for such purposes as power transfer. See, in this regard, U.S. Pat. No. 3,471,708 to Rauhut for a rotary transformer for coupling multiphase systems having a small frequency difference.

The carbon brushes typically utilized in such motors and generators wear with use over time. Dust from the worn brushes can accumulate and contaminate insulation surfaces, thereby causing undesirable effects. Moreover, operative elements in such motors and generators can become quite hot due, e.g., to electrical losses and mechanical friction.

What is needed, and an object of the present invention, is a high voltage electrical system which provides cleaning and cooling to enhance overall operation.

BRIEF SUMMARY OF THE INVENTION

An electrical current collector system comprises an electrically conductive slip ring mounted to a rotatable shaft, as well as a fixed conducting ring assembly having slip ring-contacting members mounted thereon. The slip ring and fixed conducting ring assembly are mounted to have an annular gap formed therebetween. A slip ring support assembly comprising plural post insulators spaced radially about the rotatable shaft attaches the conductive slip ring to the rotatable shaft. The slip ring and fixed conducting ring assembly are at least partially enclosed in a compartment, to which a source applies a cooling/cleaning fluid.

In accordance with the structure and method of the invention, the source directs the fluid over at least some of the post insulators for cleaning of the post insulators. Then the fluid travels through the gap to perform at least one of cooling and cleaning of an interface of the slip ring and the slip ring-contacting members.

The fixed conducting ring assembly forms an envelope having a conductive ring channel in which the slip ring-contacting members are mounted. After passing through the gap, the cooling/cleaning fluid enters into the conductive ring channel. The conductive ring channel directs the fluid in at least a partially semicircular path to an exhaust duct.

In one example deployment, the fixed conducting ring assembly is utilized in a rotating transformer system wherein the electrical current collector system applies current to a rotor assembly having rotor windings which rotates about the rotatable shaft, and wherein a stator has stator windings, and a motor is provided for rotating the rotor assembly.

BRIEF DESCRIPTION OF THE DRAWINGS

FIGS. 5A and FIG. 5B are sectioned top and side views, respectively, of a post insulator included in the rotary transformer system of FIG. 1.

DETAILED DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
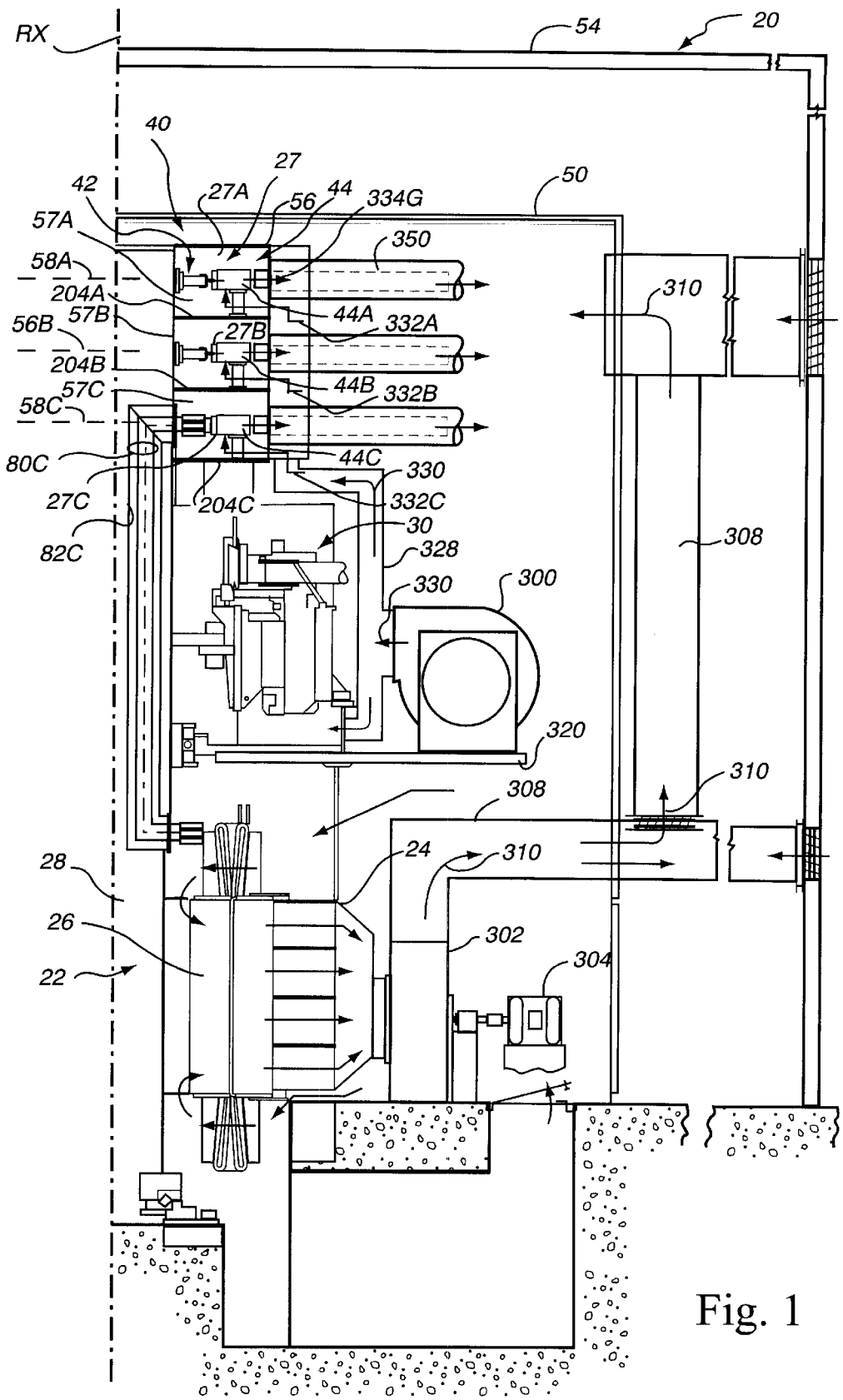
FIG. 1 is a side sectional view of an example rotating transformer system according to an embodiment of the invention.

FIG. 1 shows a rotary transformer system 20 which includes both a rotor assembly 22 and a stator 24. The rotor assembly 22 includes a rotor cage section 26, slip rings (also known as collector rings and generally depicted by reference numeral 27), and a rotatable shaft 28. Rotor assembly 22 is rotatable about an axis RX of its rotatable shaft 28 in both a clockwise direction and a counter-clockwise direction. Rotation of rotor assembly 22 is effected by a drive motor 30.

In one example deployment, rotary transformer system 20 is employed in a high voltage, high current environment having alternating voltages and current. In such example deployment, rotary transformer system 20 is connected to transfer electrical power between a first electrical system (e.g., first electrical grid) and a second electrical system (e.g., second electrical grid). In such deployment, one of the rotor assembly 22 and the stator 24 is connected (e.g., by three phase lines) to the first electrical system, and the other is connected to the second electrical system. The drive motor 30 rotates the rotor assembly 22 in response to a drive signal generated by an unillustrated control system. The first and second electrical systems may have a differing electrical characteristic (e.g., frequency or phase). The control system can bi-directionally operate the rotary transformer system 20 at a variable speed for transferring power from the first electrical system to the second electrical system or vice versa (i.e., from the second electrical system to the first electrical system). Further information concerning such example deployment and variations thereof are disclosed in the following, all of which are incorporated herein by reference in their entirety: U.S. Pat. Nos. 5,953,225; 5,742,515; 5,841,267; 5,952,816; U.S. patent application Ser. Nos. 08/825,502; and 09/443,220.

A collector system 40 positioned at the top of rotor assembly 22 comprises the slip rings 27; a slip ring support assembly 42; and, fixed conducting ring assembly 44. In view of its example deployment in a three phase system, the collector system 40 has three slip rings 27A, 27B, and 27C (any one of which is generically referred to as slip ring 27) and three corresponding fixed conducting ring assemblies 44 (any one of which is generically referred to as fixed conducting ring assembly 44). Three-phase lines leading from one of the connected electrical systems are connected to respective ones of fixed conducting ring assemblies 44 of collector system 40 of rotor assembly 22; other three-phase lines connect the other electrical system to stator 24. In the illustrated example embodiment, the slip rings 27 are 17 KV rated rings.

Figure 9:
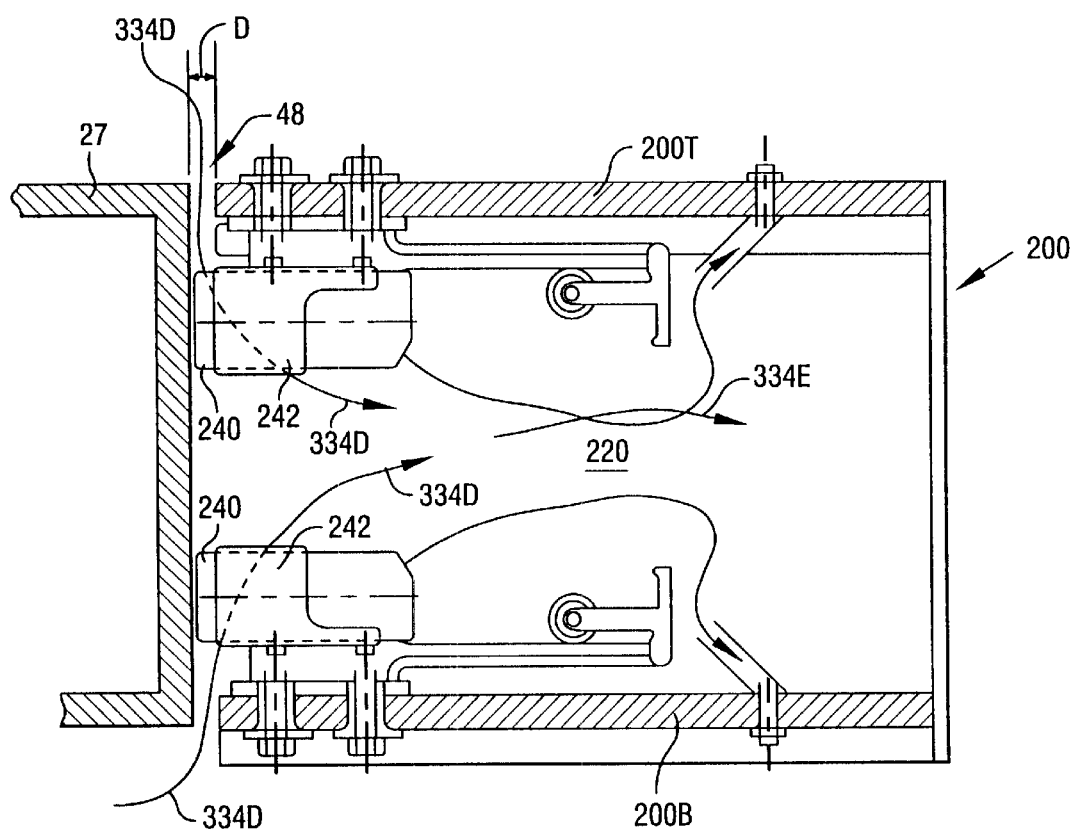
FIG. 9 is an enlarged sectional view resembling that of FIG. 8B, but additionally showing a gap between a U-shaped ring structure and a slip ring.

As described in more detail subsequently, e.g., in connection with cooling and cleaning of rotary transformer system 20 and as illustrated in FIG. 9, a small annular air flow gap 48 is provided between each slip ring 27 and its corresponding fixed conducting ring assembly 44. The air flow gap 48 has a width D on the order of about 0.5 inch (see FIG. 9).

As further shown in FIG. 1, rotary transformer system 20 is enclosed in a thermally insulated housing 50. The housing 50 is, in turn, typically situated in a building 54. The centerline in FIG. 1 which corresponds to axis RX depicts the fact that only a right side of rotary transformer system 20 is actually illustrated in FIG. 1. It is therefore understood from FIG. 1, and subsequently explained with reference to other figures, that only a portion of the structure for such components as rotor assembly 22 and stator 24 are shown in FIG. 1. Indeed, mirror images of the illustrated portions of various such components extend to the left of axis RX.

The collector system 40 can be situated in a compartment 56 of housing 50, in the manner shown in FIG. 1. The compartment 56 is subdivided into three air-sealed subcompartments 57A–57C. The collector system 40, which is used to interface electrically with rotor assembly 22, has structure essentially residing on three distinct planes, herein referred to as phase planes. In the situation depicted in FIG. 1 in which rotary transformer system 20 is vertically mounted, the three phase planes of collector system 40 are substantially horizontal planes. In a first or uppermost such phase plane, depicted by broken line 58A, both slip ring 27A and fixed conducting ring assembly 44A reside within subcompartment 57A. Similarly, in a second or middle phase plane 58B both slip ring 27B and fixed conducting ring assembly 44B reside within subcompartment 57B; and in a third or lowermost phase plane 58C both slip ring 27C and fixed conducting ring assembly 44C reside within subcompartment 57C.

Figure 2:
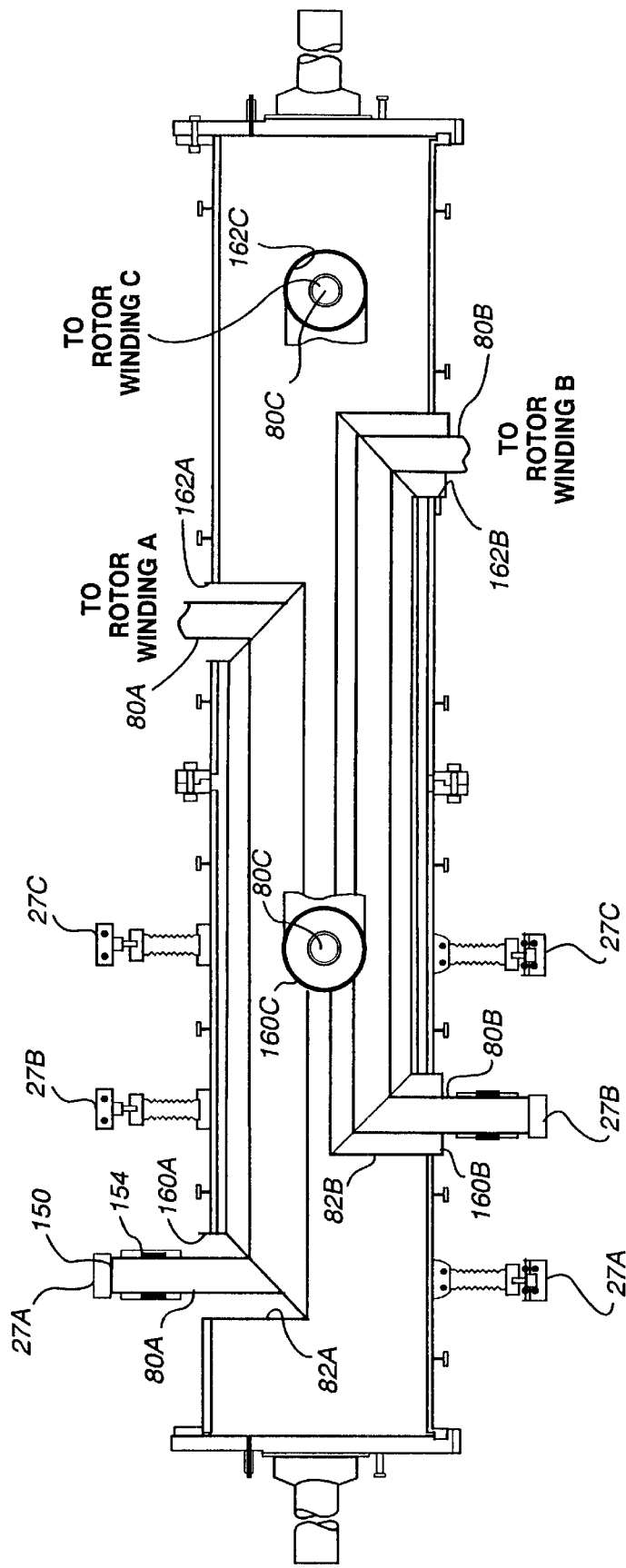
FIG. 2 is a side sectional view of a shaft assembly of the rotating transformer system of FIG. 1.

As explained hereinafter, each of the fixed conducting ring assemblies 44 have brush assemblies 70 mounted thereon angularly about rotatable shaft 28 at intervals. Electrical current is transferred between the brushes of the brush assemblies 70 and the respective slip rings 27, and hence between the rotor assembly 22 and the electrical system connected to the fixed conducting ring assembly 44. The electricity travels between the slip rings 27 and the windings of the rotor assembly 22 over bus conductors 80. There is a bus conductor 80 for each of the three phases, e.g., bus conductors 80A, 80B, and 80C, only bus conductor 80C being shown in FIG. 1. Each of the bus conductors 80 extends through a respective one of three phase isolated bus ducts 82 (only bus duct 82 being shown in FIG. 1). The three phase isolated bus ducts 82, formed internally in rotatable shaft 28, extending substantially parallel to axis RX, are further described hereinafter and illustrated in FIG. 2.

Slip Ring Support Assembly

Figure 3:
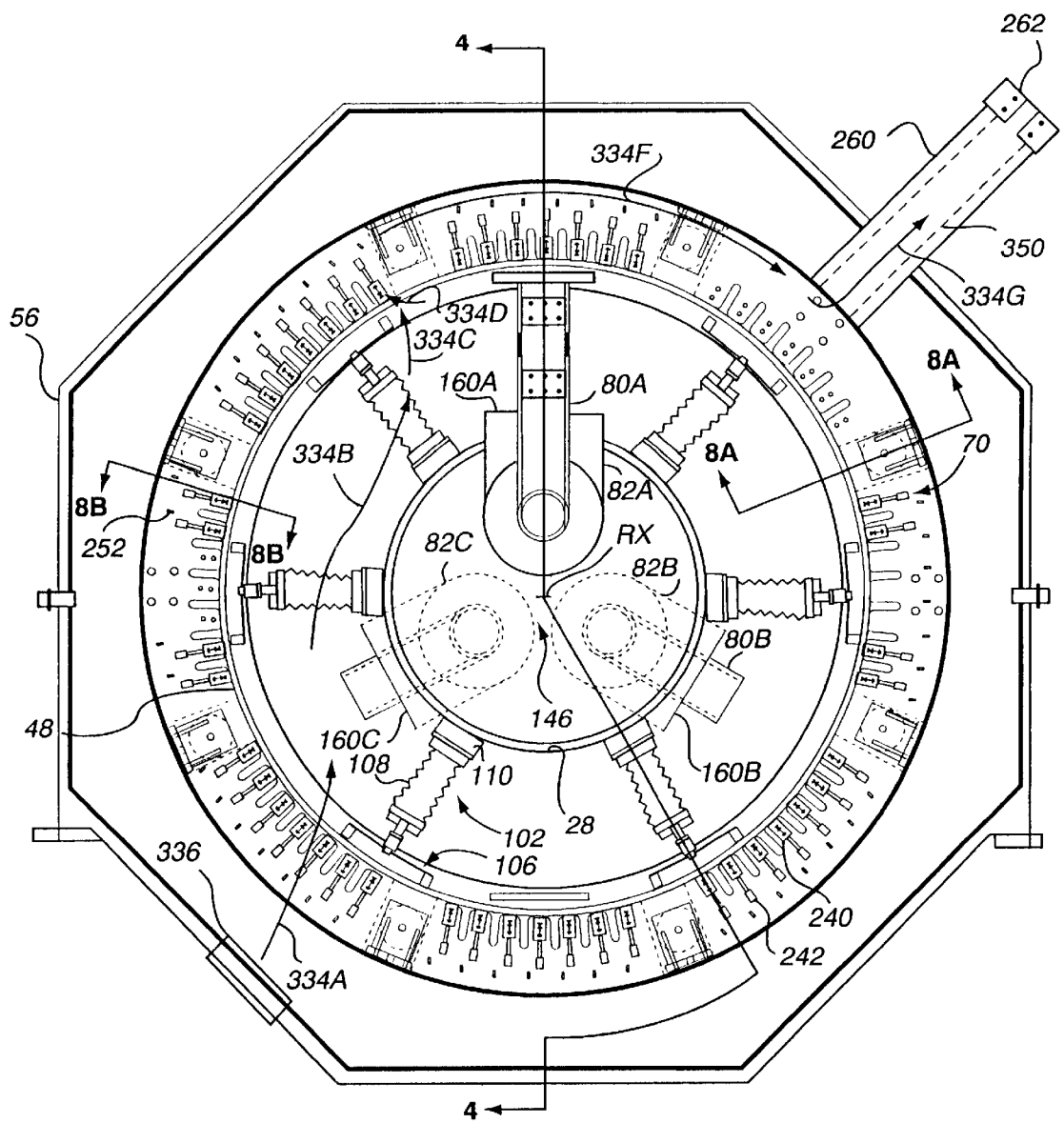
FIG. 3 is a top sectional view of the rotating transformer system of FIG. 1.
Figure 4:
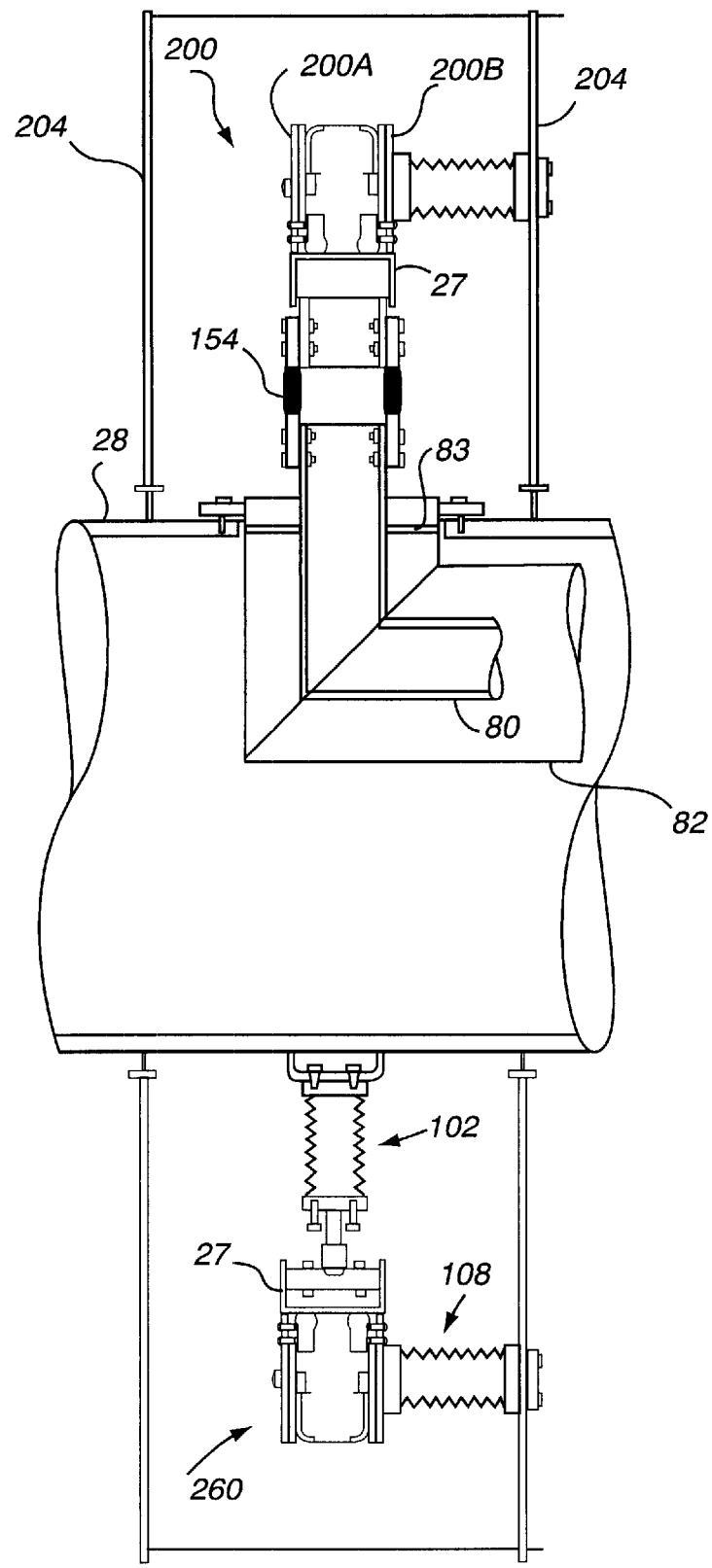
FIG. 4 is a sectional view taken along line 4—4 of FIG. 3.

One aspect of the rotary transformer system 20 concerns the slip ring support assembly 42. A slip ring support assembly 42 is provided for each phase plane 58 of collector system 40. With respect to a representative one of the phase planes 58, FIG. 3 shows slip ring support assembly 42 as comprising plural post insulators 102 mounted discretely at selected intervals about the outer circumference of rotatable shaft 28. Discrete mounting means that the the slip rings 27 are not in substantially flush contact with the periphery of rotatable shaft 28, but that (instead of flush contact) mounting members by which slip rings 27 are attached to rotatable shaft 28 are noncontinuously positioned about rotatable shaft 28 and serve, e.g., to space slip rings 27 from rotatable shaft 28 in a radial direction. As an example, FIG. 3 shows six post insulators 102 arranged about axis RX. Each of the post insulators 102 extend essentially radially from periphery of rotatable shaft 28 and have an attachment/adjustment assembly 106 surmounted thereon as hereinafter described.

A representative post insulator 102 is shown in more detail in FIG. 5A and FIG. 5B. For each post insulator 102, the attachment/adjustment assembly 106 is mounted on a post body 108, which in turn is anchored to a post base or support bracket 110. The post body 108 has two endplates, e.g., proximal end plate 114P and distal end plate 114D, between which a body midportion 116 extends. The body midportion 116 is essentially cylindrical in shape, but has substantially "V"-shaped grooves 118 radially formed therein with respect to the major axis of each post insulator 102 . Bolts 120 affix proximal end plate 114P to post base 110. Shims, washers, or both may be situated between post base 110 and proximal end plate 114P, or on the underside of post base 110.

The attachment/adjustment assembly 106 comprises a threaded rod 124 which has a first end fixedly mounted in mounting plate 126. The mounting plate 126 is secured to distal end plate 114D by bolts 128. A nut 130, which is interiorily threaded to engage exterior threads of threaded rod 124, rides on threaded rod 124, followed by a support bar 132. The support bar 132 carries a spring plate 134, with a midsection of spring plate 134 having an aperture to accommodate the protruding end of threaded rod 124.

As shown in FIG. 5B, each slip ring 27 is essentially U-shaped in cross section, having a top segment 27-T, a bottom segment 27-B, and a middle segment 27-M, and defining a slip ring interior channel 139. At positions where the post insulators 102 connect to slip ring 27, two blocks 140 are brazed to bridge the top segment 27-T and bottom segment 27-B of slip ring 27. As shown in FIG. 5A, the two blocks 140 are equally spaced apart or centered about an central axis IX of post insulator 102 (axis IX extending in a radial direction with respect to rotatable shaft 28). Fasteners 142 connect ends of the spring plate 134 to the two respective blocks 140.

The surfaces of slip rings 27, e.g., top segment 27-T, bottom segment 27-B, and middle segment 27-M are bare conductors to which the respective bus conductors 80 attach in a manner hereinafter described. As explained above, the slip rings 27 are attached to rotatable shaft 28 by stand off or post insulators 102. The body midportion 116 of post insulators 102 can be formed from porcelain or polymeric material, but are preferably polymeric in view of its higher tensile strength relative to its compressive strength (thereby affording more mechanical stability). Insulators using epoxy resin, particularly the cycloalyphatic resins, are preferred as having higher resistance to deterioration due to partial discharge activity. Also, hydrated aluminum added to silica flour fillers enhance the resistance to forming of carbon tracks under electrical discharge conditions. This anti-tracking feature is beneficial, as the insulator is not adding carbon to the carbon already being accumulated from wear of the brushes in brush assemblies 70 which are mounted on fixed conducting ring assembly 44. The post insulators 102 can have glass fibers for reinforcement, but care need be taken in assuring a proper glass-to-resin bond. The post insulators 102 can be formed by pouring into a mold under vacuum to minimize voids, and then oven cured.

The grooves 118 in post insulators 102 are provided in body midportion 116 to increase the length of the creepage path to ground, which is advantagous with brush dust being created when the collector system 40 is rotating. The design shape and/or depth of the grooves 118 depends on the particular application, with deeper grooves 118 being used in wet or dirty locations (referred to as high creep insulators). The post insulators 102 of the rotary transformer system 20 are preferably selected to have a higher than normal impulse insulation level (BIL), thereby providing a greater creep distance and the post insulators 102 are better able to survive contamination.

In one example embodiment, the slip rings 27 are on the order of about two meters in diameter, and are made of heavy copper alloy materials to carry large electrical currents. The slip rings 27 are mounted from and supported by the steel rotatable shaft 28 using the post insulators 102 described above. The structure of the post insulators 102 enables the rotary transformer system to adjust the position of slip rings 27 when necessary for compensating for mechanical imperfections and to minimize runout. The attachment/adjustment assembly 106 provides a flexible mounting arrangement which ensures that the slip rings 27 are concentric with the center of rotatable shaft 28 when initially mounted. Moreover, the attachment/adjustment assembly 106 facilitates maintenance of this concentricity and circular shape even after differential thermal expansion and contraction of the steel rotatable shaft 28 and the copper slip ring during normal operation. The spring plate 134 of attachment/adjustment assembly 106 transfers the mechanical load from the blocks 140 brazed to the inside of the slip ring interior channel 139. The nut 130 and support bar 132 are adjusted initially to bend the spring plate 134 to provide a preloading displacement that will absorb the differential movement due to temperature changes of the slip ring 27 and the rotatable shaft 28. The slip rings 27 and rotatable shaft 28 will always have a force holding them concentrically relative to each other. Flexing of the spring plate 134 absorbs thermal changes.

The rotary transformer system 20 uniquely uses both high current and high voltage at alternating power frequencies on a slip ring or collector system. To minimize skin effects on the conducting slip rings 27, the copper cross section is channel shaped (rectangularly U-shaped, as shown in FIG. 5B). In addition, the slip ring 27 is formed to have a silver-bearing copper alloy on its rubbing surface 142 and a copper alloy on the channel legs 27-T and 27-B. (see FIG. 5B).

With the high levels of electrical current that must be conducted by the slip rings 27, there are three sources of diametrical expansion/contraction loads that the slip rings 27 must accommodate. A first is diametrical expansion due to thermal rise of the ring material. A second is a centrifugal force created by rotation of the rotor. A third is a diametrical contraction produced by the spring force exerted by the brush assemblies 70. In the illustrated embodiment, the total resultant radial expansion/contraction of the slip rings 27 is from 0.5 mm to 1.0 mm, over the thermal and rotational speed cycle of operation.

Since the slip rings 27 must be electrically isolated from ground, their connection to the rotatable shaft 28 is limited as described above to several point locations (locations of post insulators 102) around the periphery of the slip rings 27. Advantageously, these point connections have the ability to allow the radial expansion of the slip ring 27, yet provide the radial and lateral restraint necessary to control the roundness and concentricity of the rights throughout the load cycle. Two mechanical conditions of the spring plate 134 needed to control the ring shape and position are the spring stiffness and the preload on the spring plate 134.

Regarding spring stiffness, the spring plate 134 at each support point must have a radial stiffness such that the free radial expansion of the slip ring 27 minus the acceptable radial shape deviation does not produce a force greater than the ring radial stiffness times the accepted radial deviation. For the illustrated example embodiment, the spring stiffness is between 20000 N/mm and 30000 N/mm.

Regarding spring preload, the amount of preload on spring plate 134 is based on three factors. A first such factor is the amount of radial expansion of the slip rings 27 in operation requiring spring follow-up to remain tight on the shaft system (e.g., rotatable shaft 28). A second factor is the amount of lateral restraint required to keep the rings centralized to the shaft system. A third factor is the acceptable local radial displacement at the load points as not to produce a ring of excesssive out-of-round condition (lumpiness). For the illustrated example embodiment, the amount of preload is between 25000 N and 40000 N.

Bus Conductors and Phase Isolated Bus Ducts

The slip rings 27 of the three phase planes are electrically connected to their respective windings on rotor assembly 22 by the bus conductors 80. As mentioned previously, the bus conductors 80 extend through respective three phase isolated bus ducts 82 formed interiorly in rotatable shaft 28. The bus ducts 82 have an air buffer 146 provided therebetween (e.g., the bus ducts 82 are not in physical contact, but are spaced apart and separated by air) [see FIG. 3]. In the illustrated example embodiment, the bus conductors 80 are tubular in shape, but other shapes can be utilized (e.g., boxed shape). A disc insulator 83 is situated a few inches inside the mouth of each bus duct 82, fitting around the corresponding bus conductor 80 to seal the bus system so, e.g., air does not pass into the bus system (see FIG. 6B). Although not necessarily shown as such, each bus conductor 80 is similarly plugged. In a duct having a square shaped cross section, current distribution is not quite as optimum as in a tube, but air can pass through a square cross section and remove heat from the inside surfaces by convection in addition to the convective and radiative cooling of the outside surface. For high voltages, the contours of the bus conductors 80 should have rounded edges and sharp projections should be avoided in order to maintain good basic impulse insulation voltage withstand levels, i.e., BILs.

Figure 6A:
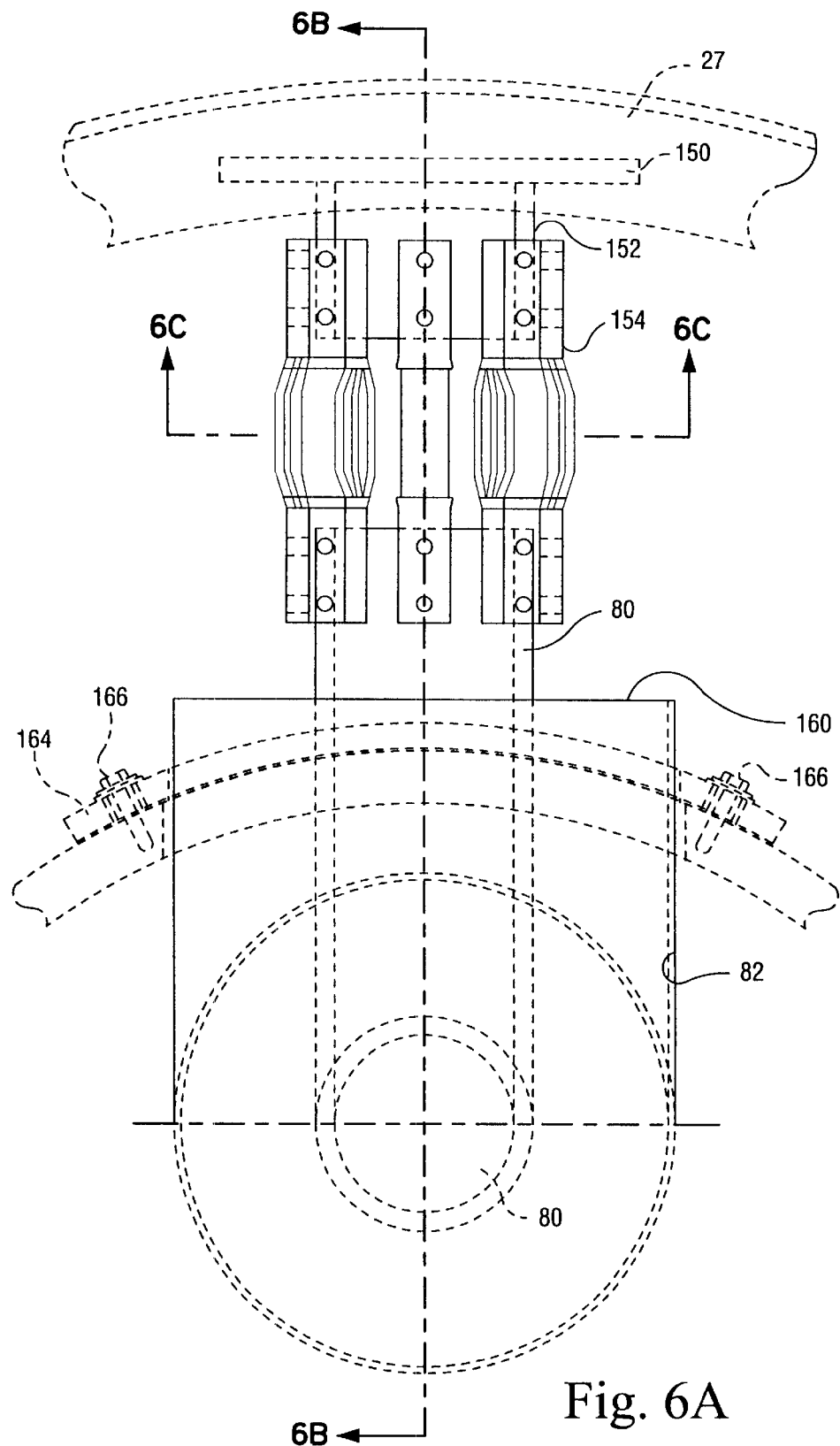
FIG. 6A is a sectional view of a portion of the rotary transformer system of FIG. 1, showing a bus conductor and its corresponding three phase isolated bus duct.
Figures 6B, 6C:
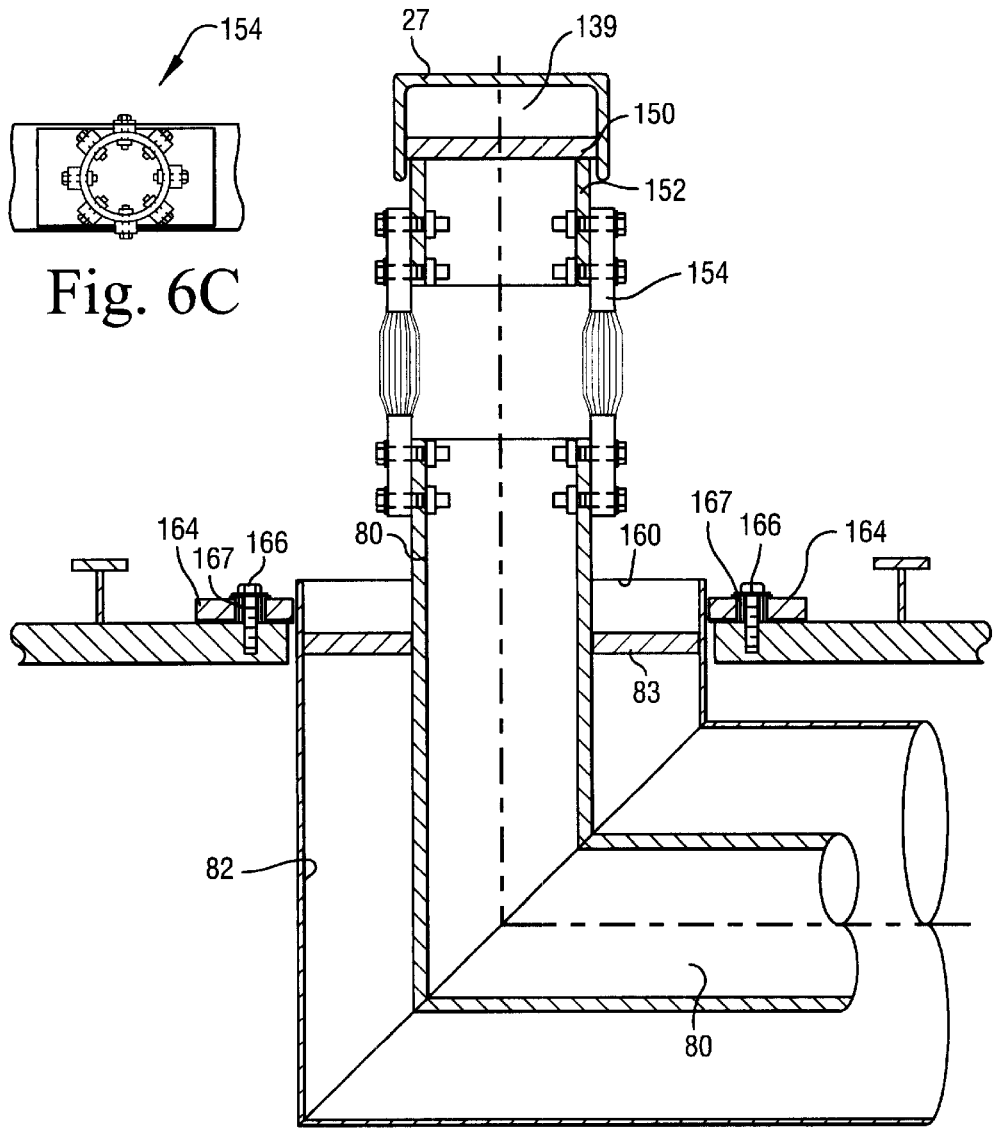
FIG. 6B is a sectioned view taken along line 6B—6B of FIG. 6A.
FIG. 6C is a sectioned view taken along line 6C—6C of FIG. 6A.

As shown in FIG. 6A and FIG. 6B, the slip ring interior channel 139 has an electrically conductive plate 150 formed to bridge the top segment 27-T and bottom segment 27-B of slip ring 27. The conductive plate 150 has a cylindrically shaped conductive extension 152 extending radially interiorily from slip ring 27 toward rotatable shaft 28. A first end of the bus conductor 80 for each phase plane is secured to extension 152, and hence to conductive plate 150 and thus to slip ring 27, by a flexible connector 154. A second end of the bus conductor 80 for each phase plane is connected to a rotor winding on rotor assembly 22 for the respective phase.

From their attachments to flexible connector 154, each bus conductor 80 extends radially toward rotatable shaft 28, entering a mouth 160 of its respective three phase isolated bus duct 82. Upon entry into mouth 160, the bus conductor 80 travels a short distance radially (with respect to the interior of rotatable shaft 28) through a first radial segment of its respective bus duct 82, and then makes an essentially ninety degree bend to travel through an axial segment of the bus duct 82. As understood with reference to FIG. 2, the bus conductor 80 then again bends into a second radial segment of bus duct 82, from which bus conductor 80 emerges through an annulus 162.

Figure 7A:
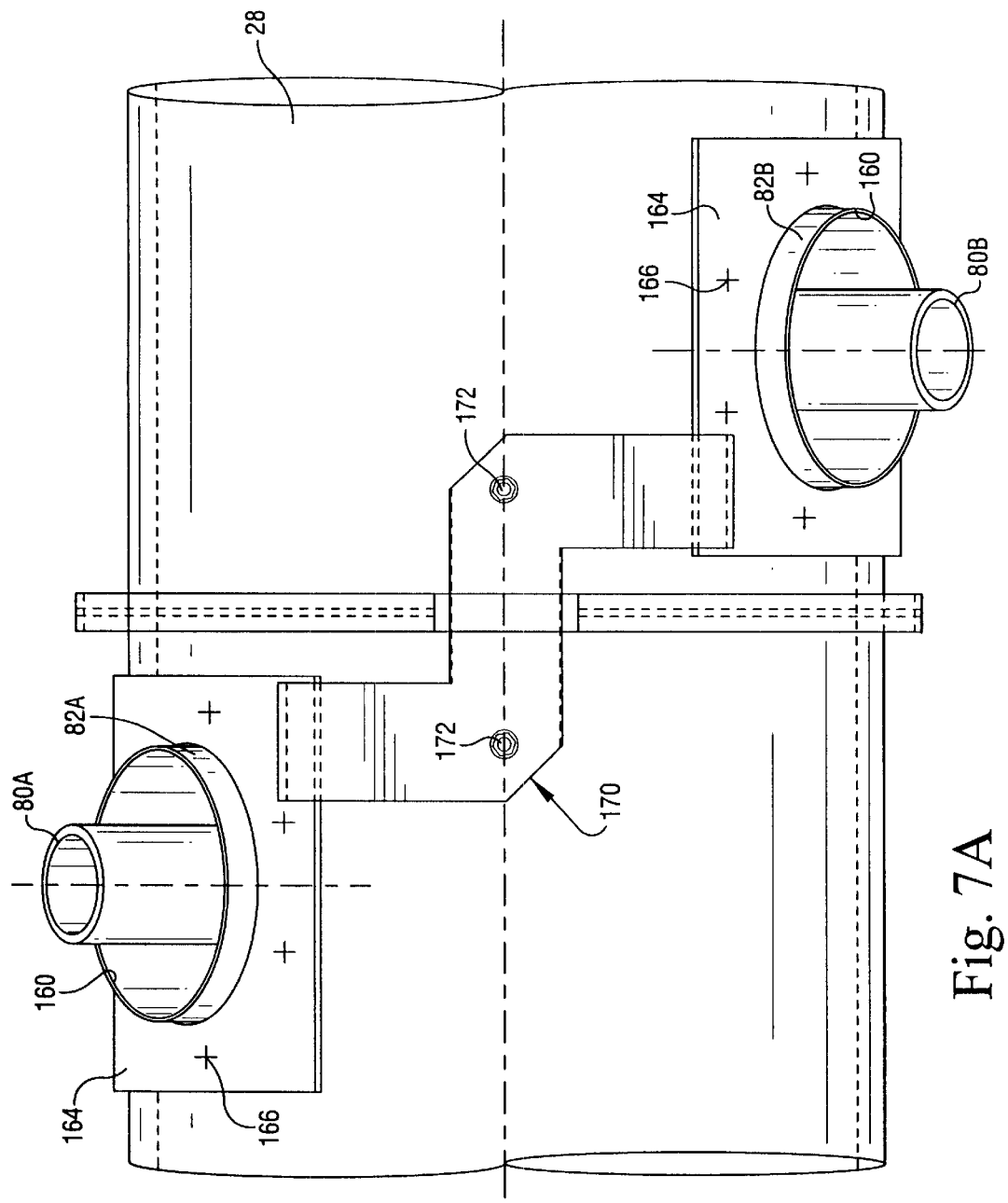
FIG. 7A is a side view of a rotatable shaft of the rotary transformer system of FIG. 1, particularly showing emergence of a bus conductor from its associated bus duct, as well as a cover plate and flux plate for the bus duct.
Figure 7C:
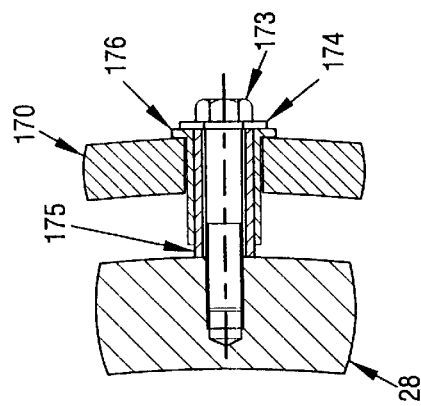
FIG. 7C is an enlarged sectioned end view of a portion of FIG. 7B, particularly showing a fastener assembly for a flux plate.
Figure 7B:
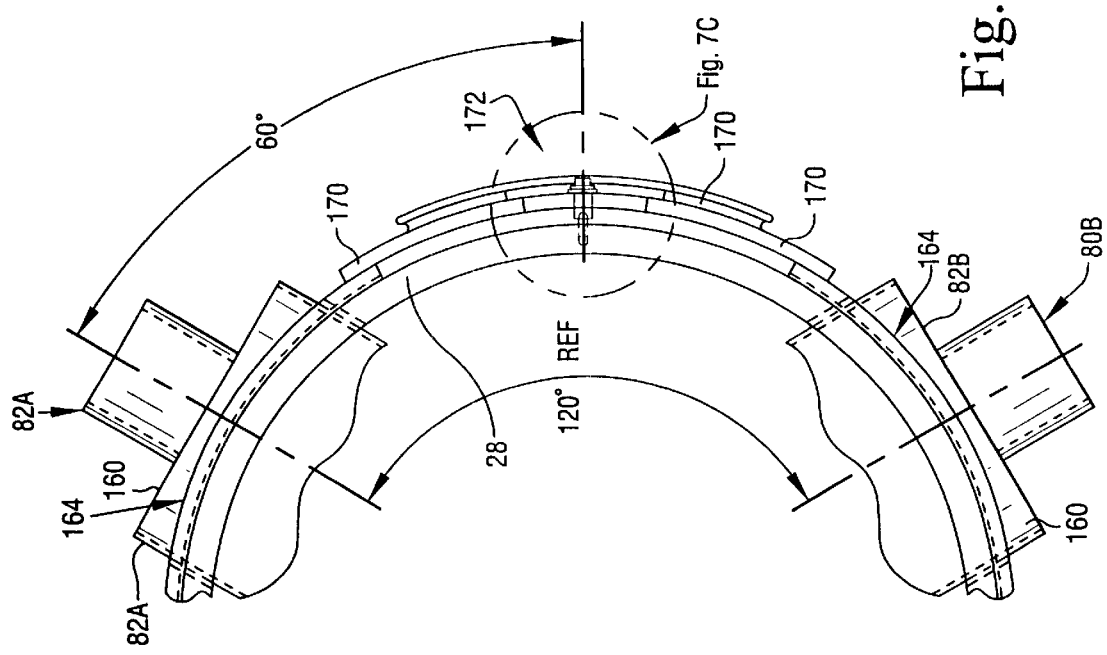
FIG. 7B is a sectioned end view of a portion of a rotatable shaft of the rotary transformer system of FIG. 1, showing, e.g., the cover plate and flux plate of FIG. 7A.

As further understood from FIG. 6A and FIG. 6B, as well as FIG. 6D and FIG. 7B, the mouth 160 and annulus 162 of each bus duct 82 extends through a cover plate 164. The cover plate 164 is secured by fasteners 166 through insulated spacers 167 and is held slight aloft above the circumference of rotatable shaft 28, thereby insulating cover plate 164 from rotatable shaft 28. The cover plates 164 of adjacent bus ducts 82 are electrically connected by an S-shaped flux plate 170. The flux plate 170 extends around the exterior of rotatable shaft 28 in the manner illustrated in FIG. 7A, and is secured to rotatable shaft 28 by fastener assemblies 172.

A fastener assembly 172 which secures flux plate 170 to rotatable shaft 8 is shown in FIG. 7C. The fastener assembly 172 essentially comprises a fastener such as bolt 173 which extends through a companion disc washer 174 and a barrel-shaped spacer 175 for threaded engagement with rotatable shaft 28. On its cylindrical exterior, the barrel-shaped spacer 175 carries a cylindrical insulating washer 176 which contacts flux plate 170.

As understood from the foregoing, each phase conductor 80 is in its own grounded metal enclosure, e.g., bus duct 82. The isolated phase bus ensures that any fault or electrical failure or arc-over will occur first to ground before becoming a phase to phase fault. As most systems are ground fault current limited, damage is minimized.

An insulation sleeve in the form of the respective bus ducts 82 on the bus conductors 80 is preferred so that ground fault arcing remains where it was initiated. With bare conductors, the arcing will motor or travel along the bus conductor 80, away from the power source, and come to rest at a terminal bushing where damage can be more serious from a repair and replacement standpoint. Also, the insulation sleeve on the bus conductors 80 permits reduction of enclosure diameters, thereby reducing space requirements.

The rotary transformer system 20 can be employed with various designs of isolated phase buses, including both a non-continuous enclosure design and a continuous enclosure design. In the non-continuous enclosure design, plural enclosure sections (e.g., plural duct sections) are provided for each phase, with each enclosure section being connected to ground at only one point. Circulating currents induced in the enclosures by the electromagnetic fields of the adjacent phases are contained within that enclosure. The electromagnetic shielding effect of the enclosures is approximately 50%.

The second design of isolated phase bus is the continuous enclosure design which is illustrated in the figures. This design has the phase enclosures (e.g., bus ducts 82) of the various phases electrically connected to each other by flux plate 170. In this regard, the phase enclosures (e.g., bus ducts 82) are electrically connected to each other by flux plates 170 at the start and end of the duct runs so that the currents induced in the enclosures by their own conductors can interconnect at the ends. The enclosure current can be of the order of 95% of the conductor in magnitude, which increases the electromagnetic shielding to 95%. This results in the magnetic heating of adjacent steel or adjacent magnetic materials being equivalent to 250 amps in the conductor for a 5000 ampere bus. This means that feebly magnetic stainless steels or non-magnetic materials may not be required on the adjacent parts such as the rotatable shaft 28, but that these parts can be ordinary magnetic steel, for example. The fields are so small, there need be no concern about eddy current heating. With the continuous enclosure isolated phase bus design, the forces that occur on the conductors 80 due to short circuit current is greatly reduced and therefore fewer conductor supports are required thereby reducing the potential tracking paths to ground and increasing the bus reliability. Arranging the phase enclosures (e.g., bus ducts 82) in a symmetrical or triangular arrangement and on the center line of the rotating shaft 28 minimizes the mechanical loading due to centrifugal effects and provides mechanical stiffness which is advantageous when using high currents on a rotating system. As the isolated phase bus has a single conductor per phase there is no problem with current sharing which could be the case with multiple conductors or multiple cables per phase.

Conducting Rings and Brush Assemblies

As explained previously, rotary transformer system 20 has a fixed conducting ring assembly 44 for each of its phase planes 58, e.g., a fixed conducting ring assembly 44A for phase plane 58A; a fixed conducting ring assembly 44B for phase plane 58B; and so forth. As shown in more detail in FIG. 8A, FIG. 8B, and FIG. 8C, each fixed conducting ring assembly 44 comprises a U-shaped ring structure 200; a ring support insulation post 202; and a ring support shelf 204.

The ring support shelf 204 serves to form a partition or grounded metal sheet between the subcompartments 57 of compartment 56.

Figure 8A:
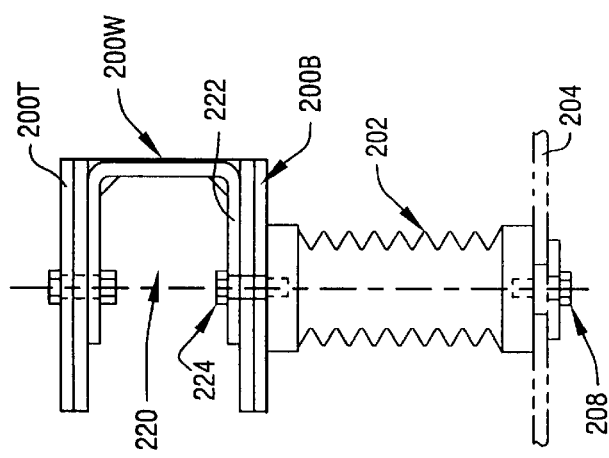
FIG. 8A is a sectional view taken along line 8A—8A of FIG. 3.

For each phase plane, plural ring support insulation posts 202 are situated on ring support shelf 204 at angular intervals about rotatable shaft 28, the ring support insulation posts 202 being anchored to ring support shelf 204 by fasteners 208 (see FIG. 8A). In the illustrated example embodiment, eight such ring support insulation posts 202 are provided per phase plane. The ring support insulation posts 202 have a similar structure to the post insulators 102 previously described, with exceptions being the manner of anchoring and attachment. In other respects, a midportion of each ring support insulation post 202 is grooved and has similar composition as the post insulators 102.

The U-shaped ring structure 200 has a top conductive ring plate 200T, a bottom conductive ring plate 200B, and a transparent covering wall 200W attached thereto. The transparent covering wall 200W is preferably formed of Lexan. A conductive ring channel 220 is formed in the interior of U-shaped ring structure 200, e.g., between top conductive ring plate 200T and a bottom conductive ring plate 200B. The edges of top conductive ring plate 200T and bottom conductive ring plate 200B are preferably rounded for sake of BIL.

At the locations whereat the ring support insulation posts 202 buttress the U-shaped ring structure 200, the U-shaped ring structure 200 has a smaller U-shaped support bracket 222 inserted therein which effectively serves also to separate the plates 200T and 200B. The U-shaped ring structure 200 is held aloft by the ring support insulation posts 202, with bolts 224 or other fasteners extending through U-shaped support bracket 222 and the bottom conductive ring plate 220B, for anchoring in a a top plate of its aligned ring support insulation post 202.

Figure 8C:
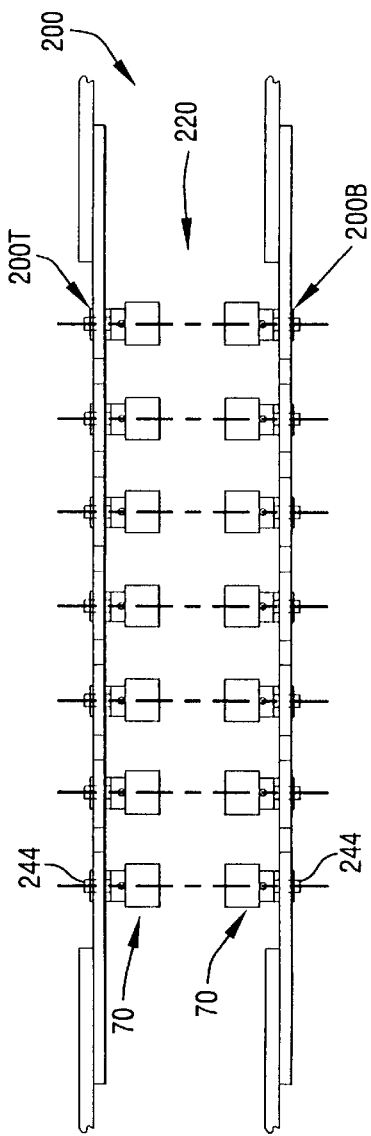
FIG. 8C is a view taken along line 8C—8C of FIG. 8B.
Figure 8B:
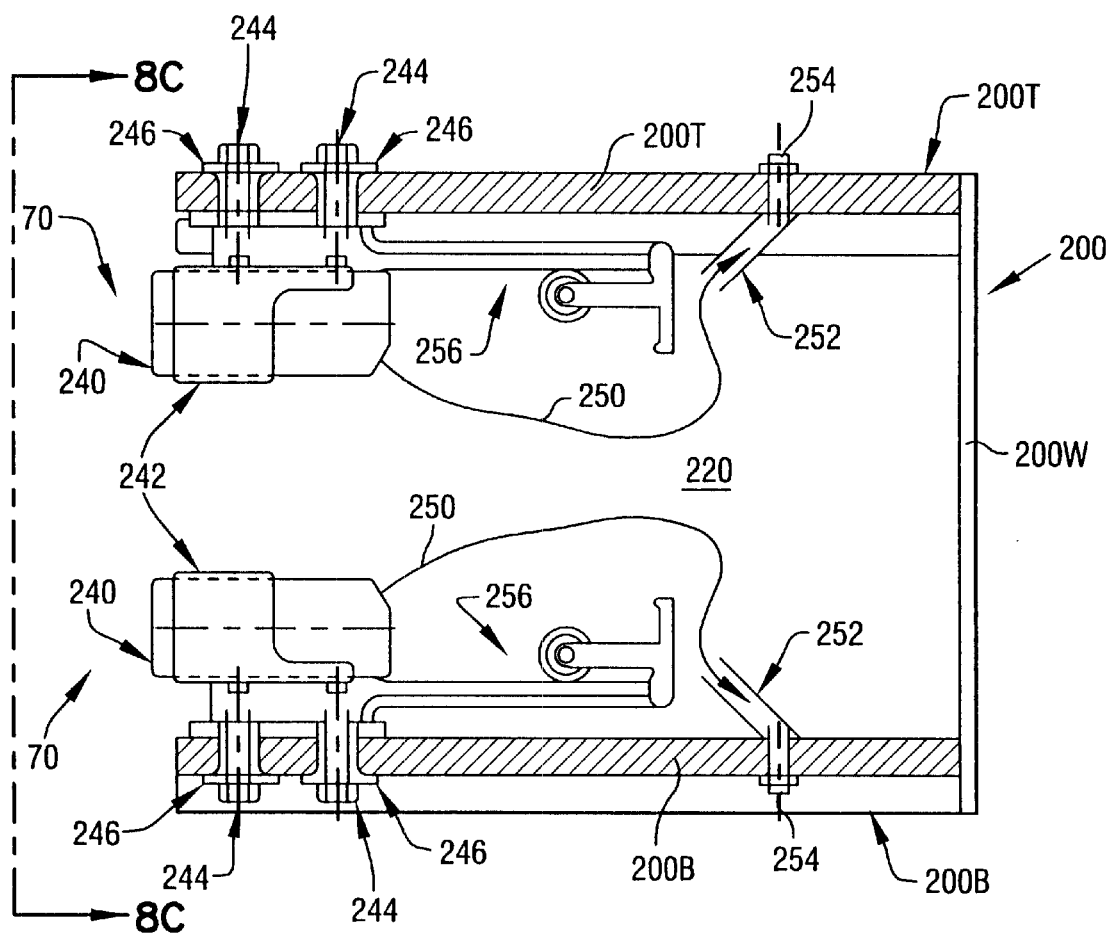
FIG. 8B is a sectional view taken along line 8B—8B of FIG. 3.

The fixed conducting ring assemblies 44 of each phase plane have brush assemblies 70 situated and mounted thereon in the manner shown, e.g., in FIG. 3, FIG. 8B, and FIG. 8C. The brush assemblies 70 are positioned at angular locations about rotatable shaft 28 in the manner shown in FIG. 3. In the example illustrated embodiment, each U-shaped ring structure 200 has eighty six brush assemblies 70 provided thereon in forty three pairs, with forty three brush assemblies 70 being suspended from beneath the top conductive ring plate 200T and another forty three brush assemblies 70 being mounted on bottom conductive ring plate 200B. In the essentially vertical orientation of rotary transformer system 20 as shown in FIG. 1, the brush assemblies 70 of each pair are vertically and angularly aligned, so that with respect to each brush assembly 70 illustrated in FIG. 3 a paired brush assembly 70 is situated immediately beneath (see also FIG. 8C).

An example pair of brush assemblies 70 employed by rotary transformer system 20 is illustrated in FIG. 8B. Each brush assembly 70 comprises a carbon brush 240 and a brush holder 242. The brush holders 242 are suspended from top conductive ring plate 200T and mounted on bottom conductive ring plate 200B by bolts 244 and washers 246. An insulation board 248 (see FIG. 8c) is interposed between the brush holder 242 and the ring plates 200T, 200B, the insulation board 248 including cylindrical posts through which the shafts of bolts 244 extend. Electrically conducting leads (e.g., copper braids) 250 emanate from the rear end of the carbon brushes 240, and terminate at a quick disconnect terminal 252 which is electrically conductively mounted by fasteners 254 in one of the ring plates 200T, 200B (see FIG. 8B). Each brush assembly 70 includes negator spring assemblies 256 for exerting an essentially constant biasing force on the carbon brushes 240 toward slip ring 27.

As shown in FIG. 3, each U-shaped ring structure 200 has an electrically conductive bus bar 260 extending radially therefrom. At its distal end remote from U-shaped ring structure 200, the bus bar 260 has a bus connector 262 provided thereon (see FIG. 3).

In the fixed conducting ring assembly 44 as described above, the carbon brushes 240 are spaced around the U-shaped ring structure 200, with power being introduced to the U-shaped ring structure 200 at a single point on a per phase plane basis (e.g., by a bus conductor 80). With high magnitude alternating current in the fixed conducting ring assembly 44, it is important to have current distribution and equal sharing of the current among the carbon brushes 240. When high resistance carbon brushes 240 are utilized and there is relatively high film drop, brush impedance becomes a major factor in current sharing (instead of inductance). In an alternate embodiment which does not employ higher resistance brushes (e.g., having low resistance contacts at the brush/ring interface), inductive shunts can be employed to facilitate current sharing. Such inductive shunts can take the form of laminated steel donut-shaped elements positioned around the leads of carbon brushes 240.

The steel donut-shaped elements can be formed, e.g., from steel punchings used in small induction motor rotors and stators. These materials have low losses, and the thin laminations minimize these losses, so they do not get too hot. The number of laminations or thickness of the steel donut-shaped elements can be varied as needed. The laminations can be bonded with adhesive or clamped together. The brush lead passes through the hole in the steel donut-shaped element. In an example embodiment, the donut-shaped elements can have an outer diameter of three to five inches, an inner diameter of one to two inches, and can be about one inch to one and a half inches thick. An outer diameter of five inches, inner diameter of two inches, and thickness of about 16 mils per lamination is currently preferred. An inductance of about 25 microHenries is provided on all radial elements.

The brush assemblies 70 are mounted in an envelope formed by U-shaped ring structure 200. Such interior mounting within the conductive ring channel 220 of U-shaped ring structure 200 reduces high electrical stresses that the corners and edges of the carbon brush leads, brush holders 242, and springs might otherwise engender in the surrounding dielectric air under high voltage conditions. The envelope for the brush assemblies 70 is at high voltage and is shaped with generous radii and smooth surfaces to minimize electrical stress concentrations. Any component within the envelope is at the same voltage as the envelope and therefore there is no adverse electrical stress between the components, so that any sharp edges or points on the brush assemblies 70 will not cause partial discharges. The envelope provided by U-shaped ring structure 200 thus acts as an electrostatic shield. Also, the electromagnetic fields inside the envelope are reduced and therefore there is less heating due to induced currents in metalic components as well as fewer proximity effects that could influence currrent distribution and current sharing in the various components.

Thus, the U-shaped ring structure 200 on the outside of the brush assemblies 70 act as a Faraday cage, with the result that any structure inside the cage is at the same voltage. The electrical stresses inside the cage are virtually zero, so that points, ends of wires, corners, and edges do not have to be relieved. The size and shape of the envelope formed by U-shaped ring structure 200 is determined by skin effects and proximity effects involved with high current conductors, as described above.

The brush assemblies 70 can, in an alternative embodiment, employ metal fiber brushes. Usage of metal fiber brushes could reduce brush losses e.g., the $I^2R$ losses in the brushes and contacts), but would possibly require he use of inductive shunts (discussed above) to control the sharing of the current in the various brush assemblies 70.

There is a resistance, and hence a voltage drop, at the interface between the carbon brushes 240 and the copper slip ring 27. This voltage drop varies with the particular materials employed, with brush pressures, and with rotational speed. This voltage drop is referred to as the film or film drop. Typically, the copper slip ring 27 will have a blackish color or film where the carbon brushes 240 have been rubbing.

The enclosures around the brush assemblies 70 are a segregated phase design wherein the individual phases are each in their own grounded metal subcompartment 57, separated from each other by a single grounded metal sheet (e.g., grounded ring support shelf 204). The provision of the grounded subcompartments 57 provides approximately fifty percent electromagnetic shielding to components outside thereof. Any electrical arc or fault that might occur will go to ground first. Should a concern arise that a fault could burn through the grounded ring support shelf 204 and thereby become a phase to phase fault, in another embodiment the subcompartments 57 could be phase isolated by providing an air buffer between the subcompartments 57, thereby eliminating the possibility of a single ground fault propagating to a phase to phase fault. Access covers become more complex with the continuous enclosure phase isolated concept, but the electromagnetic shielding can be increased to ninety five percent. As discussed above, the bus conductors 80 are similarly already phase isolated by provision of the air buffer 146 between their respective bus ducts 82, thereby providing additional reliability in this confined area.

The transparent covering wall 200W serves as a window through which the brush assemblies 70, and particularly carbon brushes 240, can be viewed. The U-shaped support brackets 222 act as braces between the plates 200T and 200B, and are periodically positioned circumferentially about fixed conducting ring assembly 44. The transparent covering wall 200W spans the space between the U-shaped support brackets 222, and thus facilitate visual inspection of the carbon brushes 240.

The present invention is not confined to the use of carbon brushes 240 as the elements for electrically contacting the slip ring 27. For example, as an alternative to using carbon brushes 240, rollers can be employed. This alternative arrangement involves replacing the carbon brushes 240 and associated hardware with roller assemblies as described below. In an example such arrangement, there could be the same number of rollers as there are pairs of carbon brushes 240. The rollers, however, can be fabricated using lower conductivity materials. Yet as another alternative, a reduced number of rollers can be employed, with silver plated surfaces and copper rollers.

Figure 10:
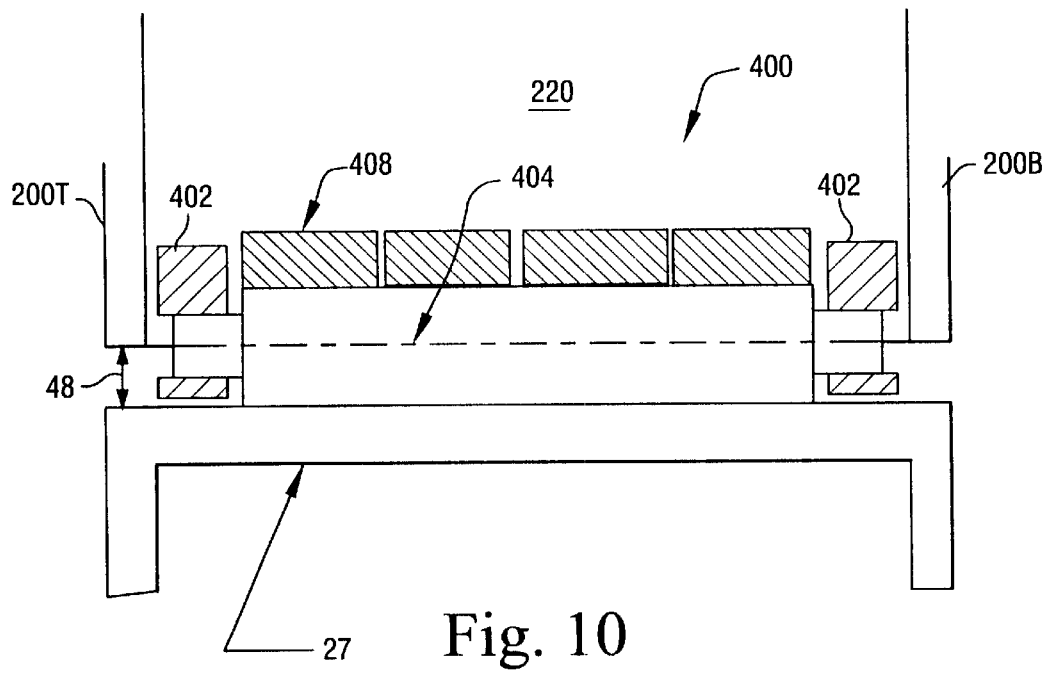
FIG. 10 is a diagrammatic view showing a roller assembly used as the slip ring-contacting elements of the rotary transformer system.

FIG. 10 shows an example roller arrangement, wherein each roller assembly 400 comprises a cage or retainer 402 which is positioned to maintain the rollers 404 parallel to each other and equally spaced around slip ring 27. The cage 402 and the rollers 404 move or rotate around the slip ring 27 at half the rotation speed of rotatable shaft 28. To provide the necessary electrical contact and to carry current without sparking, the rollers 404 must be pressed against slip ring 27. Such biasing of the rollers 404 against slip ring 27 can be effected using fixed members such as contact straps or bands 408. The current transfers from slip ring 27 into the rollers 404. Then the fixed or non-rotating contact on the other side of the roller 404 must also be under pressure to carry the current from the roller 404 to this contact. The current is then transferred from these contacts to the bus bars 200 using flexible connections such as quick disconnect terminal 252 previously illustrated. As the "fixed" contact must be spring loaded to provide the pressure against the rollers 404, a unique band assembly comprising the contact straps 408 (illustrated in FIG. 11) is used. The contact straps 408 are long strips of silver plated copper, anchored at one point to the bus bars and then wrapped approximately 300 degrees around the diameter of the outside surfaces of the rollers 404. The end of the straps is connected to a tension spring 410 that is anchored to the bus bar (e.g., U-shaped ring structure 200). Increasing the tension in the spring pulls on the strip or band and it applies radial force to the rollers 404. There are four of these bands side by side, the two outside bands next to the bus bar starting at the same position on the perimeter and the two center bars starting ninety degrees around the perimeter from the outside bars. In this way, the rollers 404 are always riding on at least two bands.

Figure 11:
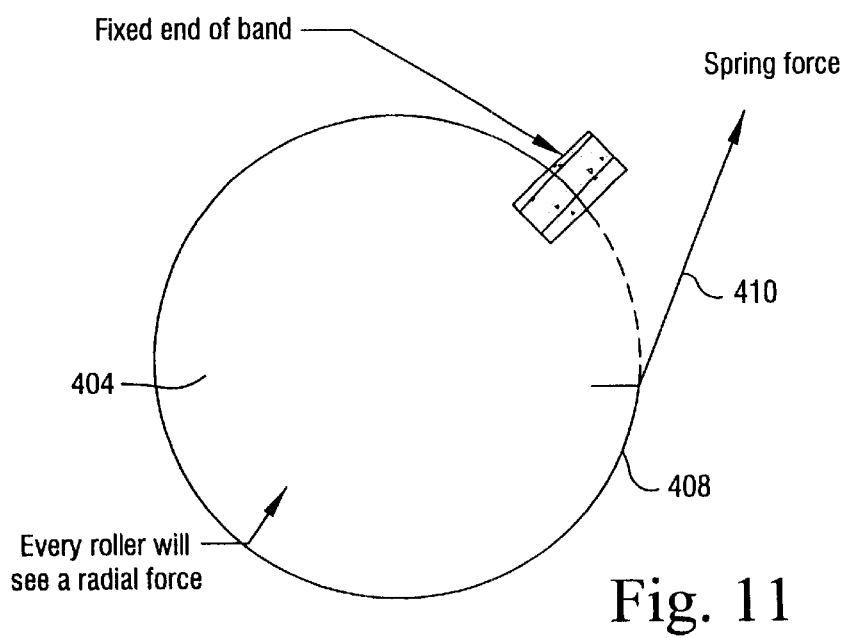
FIG. 11 is a diagrammatic view showing usage of a contact strap or band to position the rollers of the roller assembly of FIG. 10.

The contact straps or bands 408 minimize vibration and give good wearing capabilities. FIG. 11 shows that the rollers 404 are on the inside surface of the circular bands 408.

Cooling and Cleaning Systems

Since rotary transformer system 20 is operating at a high voltage, it must be enclosed. The enclosures for rotary transformer system 20, including compartment 56 of housing 50, are described above. However, in the enclosure dust produced from the wearing of the carbon brushes 240 can accumulate inside the enclosures and contaminate insulation surfaces, such as the post insulators 102. Therefore, in accordance with one aspect of rotary transformer system 20, a cooling/cleaning fluid (e.g., air) is introduced and the flow of this cooling/cleaning fluid is controlled to carry the brush dust away from the post insulators 102. As described subsequently below, filtered air from the exterior travels past the post insulators 102 inside the enclosure, scrubbing them clean. Moreover, the air flow gap 48 between slip ring 27 and fixed conducting ring assembly 44 plays a part in the cleaning and cooling of rotary transformer system 20. The cooling/cleaning fluid passes through the air flow gap 48, past the contact points of carbon brushes 240, and then along a semicircular envelope toward an exhaust. The moving cooling/cleaning fluid provides a means of carrying away heat from the carbon brushes 240 and the fixed conducting ring assembly 44, reducing the temperature rise due to electrical losses and mechanical friction.

Elaborating upon the foregoing, as shown in FIG. 1, rotary transformer system 20 has one or more cooling/cleaning sources, such as ventilation fan 300 and ventilation fan 302. The ventilation fan 302 has a fan motor 304, and is connected to apply ventilation fluid, also known as cooling/cleaning fluid (e.g., air), via duct system 308 to the interior of housing 50, as indicated by fluid flow indication arrows 310. The ventilation fan 300 is mounted on bracket 320 (attached to housing 50), and serves both motor 30 and compartment 56, including the cooling and cleaning of the slip rings 27 and the fixed conducting ring assemblies 44 with their brush assemblies 70. The cooling/cleaning fluid (e.g., air) passes from ventilation fan 300 through duct system 328 as shown by fluid flow indication arrows 330. The duct system 328 has an exit portal or the like for each phase plane 58, so that for each phase plane 58 the ventilation fluid enters into the interior of the respective subcompartments 56A, 56B, and 56C, as depicted by fluid flow indication arrows 332A–332C in FIG. 1.

An example path of the cooling/cleaning fluid for a single example phase plane 58 is shown from above rotary transformer system 20 in FIG. 3. In this regard, FIG. 3 shows by fluid flow indication arrow 334A the cooling/cleaning fluid entering through a portal 336 of duct system 328. The cooling/cleaning fluid entering the subcompartment 58 is blown toward the center of the hexagonal shaped subcompartment 58, filling the interior of subcompartment 58 up to rotatable shaft 28. As such, the entering cooling/cleaning fluid sweeps around each of the post insulators 102, as indicated by fluid flow indication arrow 334B in FIG. 3. Although FIG. 3 shows only one fluid flow indication arrow 334B, it should be understood that the cooling/cleaning fluid flows over each of the post insulators 102 in subcompartment 58, advantageously wiping any carbon dust residue (from the carbon brushes 240) therefrom and thereby reducing any creepage issues. The cooling/cleaning fluid then flows over the slip ring 27, as indicated by fluid flow indication arrow 334C, which cools the slip ring 27. The cooling/cleaning fluid then enters the air flow gap 48 between the slip ring 27 and fixed conducting ring assembly 44, as indicated by fluid flow indication arrow 334D (shown in FIG. 3 but better illustrated in FIG. 9). The air flow gap 48 thus directs the flow of cooling/cleaning fluid across the interface of the carbon brush 240 and slip ring 27. The cooling/cleaning fluid thereby enters the conductive ring channel 220 in the brush assembly 70 in an essentially radial direction (depicted by fluid flow indication arrow 334E in FIG. 9). Once in the conductive ring channel 220, the cooling/cleaning fluid travels in the conductive ring channel 220 in a semicircular path around the fixed conducting ring assembly 44, in the manner illustrated by fluid flow indication arrow 334F (see FIG. 3). Thus, inside fixed conducting ring assembly 44 the cooling/cleaning fluid moves in a semicircular fashion, even when there is no rotation of rotatable shaft 28. The cooling/cleaning fluid is then exhausted from compartment 58 through an exhaust duct 350, as illustrated by fluid flow indication arrow 334G in FIG. 3 and FIG. 1.

The velocities of the cooling/cleaning fluid is greater within the conductive ring channel 220 of fixed conducting ring assembly 44 than in the spacing interior to slip ring 27, facilitating pick up of brush dust and the like as the cooling/cleaning fluid moves around the ring shape of the conductor envelope assembly. But even in the space interior to 27, there is movement of cooling/cleaning fluid past the post insulators 102, tending to keep them clean.

In the illustrated embodiment, the exhaust duct 350 is centrally and interiorly located in bus bar 260. In an alternative embodiment, the exhaust duct 350 can enclose the bus bar 260 as a grounded enclosure, with the bus bar 260 at its distal end eventually emerging from the exhaust duct 350 through an insulated tube. In such embodiment, the exhaust duct 350 is supported by insulated posts or the like. The exhausted cooling/cleaning fluid and then be applied from exhaust duct 350 to a filtering system. The filtering system can use replaceable filters to collect any debris, e.g., brush dust.

It is important that the cooling/cleaning fluid entering from portal 336 into subcompartment 58 early wipe the post insulators 102, since the entering cooling/cleaning fluid is clean and will not contaminate the post insulators 102. Provision of the air flow gap 48 allows the cooling/cleaning fluid to flow past the interface of slip ring 27 and the carbon brushes 240 in brush assemblies 70 as depicted by fluid flow indication arrow 334D, picking up any dirt and cooling the slip ring 27. It is to be noted, as indicated by the occurrence of two fluid flow indication arrows 334D in FIG. 9, that the cooling/cleaning fluid enters the air flow gap 48 from both the upper and lower side of slip ring 27. The small size of air flow gap 48 also increases the turbulence of the flow of cooling/cleaning fluid, which also faciliates heat transfer. The cooling/cleaning fluid enters into the brush assembly envelope (e.g., conductive ring channel 220) as shown by fluid flow indication arrow 334E, travels around the fixed conducting ring assembly 44 (as shown by fluid flow indication arrow 334F), and is then exhausted (fluid flow indication arrow 334G). The positive pressure provided, e.g., by ventilation fan 300, pushes the cooling/cleaning fluid along the paths of the aforedescribed example fluid flow indication arrows 334.

Air has been cited above as one example of a suitable cooling/cleaning fluid. Other non-limiting examples of suitable fluid which can serve as the cooling/cleaning fluids are oil, hydrogen gas, and sulfahexaflouride gas ($SF_6$). Usage of $SF_6$ in a closed or sealed system can reduce the size of collector system 40. $SF_6$ has a higher thermal conductivity and higher dielectric strength than air. With $SF_6$ at one atmosphere pressure, the distance between conductors and ground can be reduced to half the air clearances.

It should be understood further that ventilation fan 300 and ventilation fan 302 are just examples of sources of the cooling/cleaning fluid. Other sources which can direct the cooling/cleaning fluid into the appropriate compartments are also within the scope of the invention, such as pressurized sources of cooling/cleaning fluid, for example.

The collector system 40 must perform whether the rotor assembly 22 of rotary transformer system 20 is rotating or at standstill. Rotation of rotor assembly 22 can be in either direction (clockwise or counterclockwise). In designing a particular application for collector system 40, attention must be given to appropriate cross sectional areas for each of the conductors, increased area of heat dissipation surfaces, and examination of brush contact phenomena.

The collector system of the present invention thus transfers high current at high voltage across a rotating surface, with various advantages. The present invention allows random speed and even slow speed, including extended operation at standstill. The present invention has low external electromagnetic fields induced by the current into the collector. Further, the collector system of the present invention has high reliability, low maintenance, and low cost.

As used herein, "high voltage" in the rotating machine art is understood to be in a range of 13.8 kV up to at least 26 kV, and can be higher. Low voltage is generally considered to be 4 KV and below; medium voltage is deemed to be 6600 v and 7200 v.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electrical current collector system comprising:
an electrically conductive slip ring mounted to a rotatable shaft;
a fixed conducting ring assembly having slip ring contacting members mounted thereon;
wherein the slip ring and fixed conducting ring assembly are mounted to have a gap formed therebetween;
a phase isolated compartment for at least partially enclosing the slip ring and the fixed conducting ring assembly;
a source which directs a fluid into the compartment so that the fluid travels through the gap to perform at least one of cooling and cleaning of an interface of the slip ring and the slip ring contacting members.

2. The apparatus of claim 1, wherein the gap is an annular gap.

3. The apparatus of claim 1, wherein the slip ring contacting members are brushes.

4. The apparatus of claim 1, wherein the slip ring contacting members are rollers.

5. The apparatus of claim 1, wherein the fixed conducting ring assembly forms an envelope having a conductive ring channel in which the slip ring contacting members are mounted, and wherein fluid directed through the gap travels into the conductive ring channel.

6. The apparatus of claim 1, further comprising a slip ring support assembly comprising plural post insulators spaced radially about the rotatable shaft for attaching the conductive slip ring to the rotatable shaft, and wherein the source directs the fluid over at least some of the post insulators for cleaning of the post insulators prior to directing the fluid through the gap.

7. The apparatus of claim 1, wherein the source of the fluid is a fan.

8. The apparatus of claim 1, wherein the current collector system is an AC high voltage electrical current collector system, and wherein the a source introduces the fluid under positive pressure into the fixed conducting ring assembly.

9. The apparatus of claim 1, wherein the electrical current collector system is an AC high voltage electrical current collector system.

10. The apparatus of claim 9, wherein the conductive ring channel directs the fluid in at least a partially semicircular path to an exhaust duct.

11. The apparatus of claim 1, wherein the fixed conducting ring assembly comprises a first conducting plate and a second conducting plate positioned parallel to one another to form a conductive ring channel therebetween, and wherein the slip ring contacting members are mounted in the conductive ring channel.

12. The apparatus of claim 11, wherein at least some of the slip ring contacting members are mounted on the first conducting plate and at least others of the slip ring contacting members are mounted on the second conducting plate.

13. The apparatus of claim 11, wherein the slip ring contacting members are mounted in pairs in the fixed conducting ring assembly, one slip ring contacting member of each pair being mounted on the first conducting plate and another slip ring contacting member of each pair being mounted on the second conducting plate.

14. The apparatus of claim 11, wherein a wall extends between the first conducting plate and the second conductive plate of the fixed conducting ring assembly to further define the conductive ring channel, and wherein at least a portion of the wall is formed from a transparent material to permit visual inspection of the slip ring contacting members.

15. An electrical current collector system comprising:
a rotatable shaft;
an electrically conductive slip ring;
a slip ring support assembly comprising plural post insulators spaced radially about the rotatable shaft for attaching the conductive slip ring to the rotatable shaft;
a fixed conducting ring assembly having slip ring contacting members mounted thereon;
a phase isolated compartment for at least partially enclosing the slip ring and the fixed conducting ring assembly;
a source for applying a fluid into the compartment and which directs the fluid over at least some of the post insulators for cleaning of the post insulators.

16. The apparatus of claim 15, wherein the electrical current collector system is an AC high voltage electrical current collector system.

17. The apparatus of claim 15, wherein the current collector system is an AC high voltage electrical current collector system, and wherein the a source introduces the fluid under positive pressure into the fixed conducting ring assembly.

18. The apparatus of claim 15, wherein the slip ring and fixed conducting ring assembly are mounted to have a gap formed therebetween, and wherein the fluid which is directed over the at least some of the post insulators travels through the gap to perform at least one of cooling and cleaning of an interface of the slip ring and the slip ring contacting members.

19. The apparatus of claim 18, wherein the gap is an annular gap.

20. The apparatus of claim 18, wherein the slip ring contacting members are brushes.

21. The apparatus of claim 18, wherein the slip ring contacting members are rollers.

22. The apparatus of claim 18, wherein the source of the fluid is a fan.

23. The apparatus of claim 18, wherein the fixed conducting ring assembly forms an envelope having a conductive ring channel in which the slip ring contacting members are mounted, and wherein fluid directed through the gap travels into the conductive ring channel.

24. The apparatus of claim 23, wherein the conductive ring channel directs the fluid in at least a partially semicircular path to an exhaust duct.

25. A rotating transformer system comprising:
a rotor assembly having rotor windings which rotates about a rotatable shaft;
a stator having stator windings;
a motor for rotating the rotor assembly;
a high voltage current collector system through which current is applied to the rotor assembly, and wherein the high voltage current collector system comprises:
an electrically conductive slip ring mounted to the rotatable shaft;
a fixed conducting ring assembly having slip ring contacting members mounted thereon;
wherein the slip ring and fixed conducting ring assembly are mounted to have a gap formed therebetween;
a phase isolated compartment for at least partially enclosing the slip ring and the fixed conducting ring assembly;
a source which directs a fluid into the compartment so that the fluid travels through the gap to perform at least one of cooling and cleaning of an interface of the slip ring and the slip ring contacting members.

26. The apparatus of claim 25, wherein the gap is an annular gap.

27. The apparatus of claim 25, wherein the slip ring contacting members are brushes.

28. The apparatus of claim 25, wherein the slip ring contacting members are rollers.

29. The apparatus of claim 25, wherein the fixed conducting ring assembly forms an envelope having a conductive ring channel in which the slip ring contacting members are mounted, and wherein fluid directed through the gap travels into the conductive ring channel.

30. The apparatus of claim 25, further comprising a slip ring support assembly comprising plural post insulators spaced radially about the rotatable shaft for attaching the conductive slip ring to the rotatable shaft, and wherein the source directs the fluid over at least some of the post insulators for cleaning of the post insulators prior to directing the fluid through the gap.

31. The apparatus of claim 25, wherein the source of the fluid is a fan.

32. The apparatus of claim 25, wherein the electrical current collector system is an AC high voltage electrical current collector system.

33. The apparatus of claim 25, wherein the current collector system is an AC high voltage electrical current collector system, and wherein the a source introduces the fluid under positive pressure into the fixed conducting ring assembly.

34. The apparatus of claim 25, wherein the fixed conducting ring assembly comprises a first conducting plate and a second conducting plate positioned parallel to one another to form a conductive ring channel therebetween, and wherein the slip ring contacting members are mounted in the conductive ring channel.

35. The apparatus of claim 34, wherein a wall extends between the first conducting plate and the second conductive plate of the fixed conducting ring assembly to further define the conductive ring channel, and wherein at least a portion of the wall is formed from a transparent material to permit visual inspection of the slip ring contacting members.

36. The apparatus of claim 25, wherein the fixed conducting ring assembly comprises a first conducting plate and a second conducting plate positioned parallel to one another to form a conductive ring channel therebetween, and wherein the slip ring contacting members are mounted in the conductive ring channel.

37. The apparatus of claim 36, wherein at least some of the slip ring contacting members are mounted on the first conducting plate and at least others of the slip-ring contacting members are mounted on the second conducting plate.

38. The apparatus of claim 36, wherein the slip ring contacting members are mounted in pairs in the fixed conducting ring assembly, one slip ring contacting member of each pair being mounted on the first conducting plate and another slip ring contacting member of each pair being mounted on the second conducting plate.

39. A rotating transformer system comprising:
a rotor assembly having rotor windings which rotates about a rotatable shaft;
a stator having stator windings;
a motor for rotating the rotor assembly;
a high voltage current collector system through which current is applied to the rotor assembly, and wherein the high voltage current collector system comprises:
an electrically conductive slip ring;
a slip ring support assembly comprising plural post insulators spaced radially about the rotatable shaft for attaching the conductive slip ring to the rotatable shaft;
a fixed conducting ring assembly having slip ring contacting members mounted thereon;
a phase isolated compartment for at least partially enclosing the slip ring and the fixed conducting ring assembly;
a source for applying a fluid into the compartment and which directs the fluid over at least some of the post insulators for cleaning of the post insulators.

40. The apparatus of claim 39, wherein the slip ring and fixed conducting ring assembly are mounted to have a gap formed therebetween, and wherein the fluid which is directed over the at least some of the post insulators travels through the gap to perform at least one of cooling and cleaning of an interface of the slip ring and the slip ring contacting members.

41. The apparatus of claim 40, wherein the gap is an annular gap.

42. The apparatus of claim 39, wherein the slip ring contacting members are brushes.

43. The apparatus of claim 39, wherein the slip ring contacting members are rollers.

44. The apparatus of claim 39, wherein the fixed conducting ring assembly forms an envelope having a conductive ring channel in which the slip ring-contacting members are mounted, and wherein fluid directed through the gap travels into the conductive ring channel.

45. The apparatus of claim 39, wherein the electrical current collector system is an AC high voltage electrical current collector system.

46. The apparatus of claim 39, wherein the current collector system is an AC high voltage electrical current collector system, and wherein the a source introduces the fluid under positive pressure into the fixed conducting ring assembly.

47. The apparatus of claim 35, wherein the source of the fluid is a fan.

48. A method of operating an electrical current collector system which comprises an electrically conductive slip ring mounted to a rotatable shaft and a fixed conducting ring assembly having slip ring contacting members mounted thereon, the method comprising applying fluid through a gap formed between the slip ring and fixed conducting ring assembly to perform at least one of cooling and cleaning of an interface of the slip ring and the slip ring contacting members;
wherein the fixed conducting ring assembly forms an envelope having a conductive ring channel in which the slip ring contacting members are mounted, and
wherein the method further comprises using the conductive ring channel to direct the fluid in at least a partially semicircular path to an exhaust duct.

49. The method of claim 48, wherein the slip ring support assembly comprises plural post insulators spaced radially about the rotatable shaft for attaching the conductive slip ring to the rotatable shaft, and wherein the method further comprises directing the fluid over at least some of the post insulators for cleaning of the post insulators.

50. The method of claim 49, wherein the fluid is directed over the at least some of the post insulators prior to traveling through the gap.

51. A method of operating an electrical current collector system which comprises an electrically conductive slip ring mounted to a rotatable shaft and a fixed conducting ring assembly having slip ring contacting members mounted thereon, the slip ring support assembly comprising plural post insulators spaced radially about the rotatable shaft for attaching the conductive slip ring to the rotatable shaft, and wherein the method comprises directing fluid over at least some of the post insulators for cleaning of the post insulators;

wherein the system further comprises a gap formed between the slip ring and fixed conducting ring assembly;

wherein the method further comprises directing the fluid through the gap to perform at least one of cooling and cleaning of an interface of the slip ring and the slip ring contacting members; and wherein the fluid is directed over the at least some of the post insulators prior to traveling through the gap.

52. An electrical current collector system comprising:

an electrically conductive slip ring mounted to a rotatable shaft;

a fixed conducting ring assembly having slip ring contacting members mounted thereon;

wherein the slip ring and fixed conducting ring assembly are mounted to have a gap formed therebetween;

a source which directs a fluid through the gap to perform at least one of cooling and cleaning of an interface of the slip ring and the slip ring contacting members;

wherein the fixed conducting ring assembly forms an envelope having a conductive ring channel in which the slip ring contacting members are mounted, and wherein fluid directed through the gap travels into the conductive ring channel.

53. The apparatus of claim 52, wherein the conductive ring channel directs the fluid in at least a partially semicircular path to an exhaust duct.

54. An electrical current collector system comprising:

a rotatable shaft;

an electrically conductive slip ring;

a slip ring support assembly comprising plural post insulators spaced radially about the rotatable shaft for attaching the conductive slip ring to the rotatable shaft;

a fixed conducting ring assembly having slip ring contacting members mounted thereon;

a source which directs a fluid over at least some of the post insulators for cleaning of the post insulators;

wherein the fixed conducting ring assembly forms an envelope having a conductive ring channel in which the slip ring contacting members are mounted; and wherein fluid directed over at least some of the post insulators travels into the conductive ring channel.

55. A rotating transformer system comprising:

a rotor assembly having rotor windings which rotates about a rotatable shaft;

a stator having stator windings;

a motor for rotating the rotor assembly;

a high voltage current collector system through which current is applied to the rotor assembly, and wherein the high voltage current collector system comprises:

an electrically conductive slip ring mounted to the rotatable shaft;

a fixed conducting ring assembly having slip ring contacting members mounted thereon;

wherein the slip ring and fixed conducting ring assembly are mounted to have a gap formed therebetween;

a source which directs a fluid through the gap to perform at least one of cooling and cleaning of an interface of the slip ring and the slip ring contacting members;

wherein the fixed conducting ring assembly forms an envelope having a conductive ring channel in which the slip ring contacting members are mounted, and wherein fluid directed through the gap also travels into the conductive ring channel.

56. The apparatus of claim 55, wherein the conductive ring channel directs the fluid in at least a partially semicircular path to an exhaust duct.

57. A rotating transformer system comprising:

a rotor assembly having rotor windings which rotates about a rotatable shaft;

a stator having stator windings;

a motor for rotating the rotor assembly;

a high voltage current collector system through which current is applied to the rotor assembly, and wherein the high voltage current collector system comprises:

an electrically conductive slip ring;

a slip ring support assembly comprising plural post insulators spaced radially about the rotatable shaft for attaching the conductive slip ring to the rotatable shaft;

a fixed conducting ring assembly having slip ring contacting members mounted thereon;

a source which directs the fluid over at least some of the post insulators for cleaning of the post insulators;

wherein the fixed conducting ring assembly forms an envelope having a conductive ring channel in which the slip ring-contacting members are mounted, and wherein fluid directed over at least some of the post insulators also travels into the conductive ring channel.

* * * * *

UNITED STATES PATENT AND TRADEMARK OFFICE
CERTIFICATE OF CORRECTION

PATENT NO.    : 6,465,926 B2
DATED         : October 15, 2002
INVENTOR(S)   : Robert H. Rehder et al.

It is certified that error appears in the above-identified patent and that said Letters Patent is hereby corrected as shown below:

Column 5,
Line 63, kindly insert -- 20 -- after "rotary transformer system".

Column 7,
Line 59, kindly delete "shaft 8" and insert -- shaft 28 -- therefor.

Column 11,
Line 8, kindly delete "require he" and insert -- require the -- therefor.

Signed and Sealed this

Twelfth Day of August, 2003

JAMES E. ROGAN
*Director of the United States Patent and Trademark Office*